US007390362B2

(12) United States Patent
Russ

(10) Patent No.: US 7,390,362 B2
(45) **Date of Patent: *Jun. 24, 2008**

(54) THERMAL PRINTER

(75) Inventor: Wray Russ, Modesto, CA (US)

(73) Assignee: Microboards LLC, Chanhassen, MN (US)

( * ) Notice: Subject to any disclaimer, the term of this patent is extended or adjusted under 35 U.S.C. 154(b) by 14 days.

This patent is subject to a terminal disclaimer.

(21) Appl. No.: 11/026,743

(22) Filed: Dec. 30, 2004

(65) Prior Publication Data

US 2005/0195268 A1 Sep. 8, 2005

Related U.S. Application Data

(63) Continuation-in-part of application No. 10/272,325, filed on Oct. 15, 2002, now Pat. No. 6,887,313.

(51) Int. Cl.
*B05B 13/02* (2006.01)
*B41J 3/407* (2006.01)
*B41J 29/393* (2006.01)
*G11B 17/08* (2006.01)

(52) U.S. Cl. .......................... 118/324; 118/46; 118/712; 347/4; 347/19; 347/104; 369/30.52

(58) Field of Classification Search ................. 118/300, 118/324, 46, 302, 712, 713; 347/4, 222, 347/197, 110, 104, 171, 193, 19; 427/424; 369/30.52, 30.9; 101/35, 44
See application file for complete search history.

(56) References Cited

U.S. PATENT DOCUMENTS

| | | | |
|---|---|---|---|
| 2,296,013 A | 9/1942 | Bell | |
| 2,304,437 A | 12/1942 | Bell | |
| 4,195,961 A | 4/1980 | Waiblinger | |
| 4,336,275 A | 6/1982 | Scholes | |
| 4,504,186 A | 3/1985 | Richards | |
| 4,595,481 A | 6/1986 | Allen et al. | |
| 4,683,708 A * | 8/1987 | Linder | 53/540 |
| 4,735,540 A | 4/1988 | Allen et al. | |
| 4,921,397 A | 5/1990 | Watanabe | |
| 5,123,005 A | 6/1992 | Kurosu | |
| 5,210,729 A | 5/1993 | Schmidt et al. | |

(Continued)

FOREIGN PATENT DOCUMENTS

EP 0799710 10/1997

(Continued)

OTHER PUBLICATIONS

Edmedia Professional, "*Buyers Guide to CD Duplication Systems—40 New towers autoloaders jukeboxes*", Nov. 1997.

*Primary Examiner*—Yewebdar Tadesse
(74) *Attorney, Agent, or Firm*—Buchanan Ingersoll & Rooney LLP

(57) ABSTRACT

A thermal printer comprising a dispenser configured to dispense a medium from a stack of mediums and a conveyor belt assembly configured to receive the medium from the dispenser and convey the medium from a first position to a second position. A thermal printer is located between the first position and the second position and marks indicia on the medium. At least one sensor positions the print head of the thermal printer on an upper surface of the medium during the marking process.

9 Claims, 16 Drawing Sheets

U.S. PATENT DOCUMENTS

| | | | | |
|---|---|---|---|---|
| 5,317,337 | A | 5/1994 | Ewaldt | |
| 5,322,188 | A | 6/1994 | Dodaro | |
| 5,397,214 | A | 3/1995 | Cheung | |
| 5,520,106 | A | 5/1996 | Karlyn et al. | |
| 5,520,107 | A | 5/1996 | Airoldi | |
| 5,537,376 | A | 7/1996 | Ikuma | |
| 5,721,715 | A | 2/1998 | Mitani et al. | |
| 5,726,967 | A * | 3/1998 | Tanaka et al. | 369/30.78 |
| 5,734,629 | A | 3/1998 | Lee et al. | |
| 5,757,389 | A * | 5/1998 | Schwede et al. | 347/4 |
| 5,757,407 | A | 5/1998 | Rezanka | |
| 5,758,038 | A | 5/1998 | Itoh et al. | |
| 5,784,171 | A * | 7/1998 | Kano | 358/296 |
| 5,822,162 | A | 10/1998 | Tannert | |
| 5,846,005 | A | 12/1998 | Britz et al. | |
| 5,857,710 | A | 1/1999 | Leising et al. | |
| 5,865,114 | A | 2/1999 | Averill et al. | |
| 5,912,680 | A | 6/1999 | Uchida et al. | |
| 5,914,918 | A | 6/1999 | Lee et al. | |
| 5,927,208 | A | 7/1999 | Hagstrom et al. | |
| 5,984,295 | A | 11/1999 | Britz | |
| 6,012,403 | A * | 1/2000 | Codos et al. | 112/117 |
| 6,075,758 | A | 6/2000 | Wu | |
| 6,123,020 | A | 9/2000 | Wolfer et al. | |
| 6,134,213 | A | 10/2000 | Suzuki et al. | |
| 6,135,316 | A | 10/2000 | Wolfer et al. | |
| 6,147,960 | A | 11/2000 | Wolfer et al. | |
| 6,148,722 | A | 11/2000 | Hagstrom | |
| 6,213,457 | B1 | 4/2001 | Schlough | |
| 6,222,800 | B1 | 4/2001 | Miller et al. | |
| 6,302,601 | B1 | 10/2001 | Hagstrom et al. | |
| 6,332,680 | B1 | 12/2001 | Ozawa | |
| 6,354,502 | B1 | 3/2002 | Hagstrom et al. | |
| 6,447,181 | B1 | 9/2002 | Hagstrom et al. | |
| 6,474,805 | B2 | 11/2002 | Dante et al. | |
| 6,499,841 | B1 | 12/2002 | Uchida et al. | |
| 6,523,921 | B2 * | 2/2003 | Codos | 347/8 |
| 6,580,444 | B1 * | 6/2003 | Drynkin et al. | 347/171 |
| 6,709,175 | B1 | 3/2004 | Drynkin et al. | |
| 6,760,052 | B2 | 7/2004 | Cummins et al. | |
| 6,793,302 | B2 | 9/2004 | Russ | |
| 6,795,103 | B2 | 9/2004 | Okayasu et al. | |
| 6,801,234 | B2 | 10/2004 | Nishimura | |
| 6,887,313 | B2 | 5/2005 | Russ | |
| 7,063,746 | B2 * | 6/2006 | Russ | 118/324 |
| 2002/0012036 | A1 | 1/2002 | Dante et al. | |
| 2002/0021921 | A1 | 2/2002 | Akema et al. | |
| 2002/0092735 | A1 | 7/2002 | Greive et al. | |

FOREIGN PATENT DOCUMENTS

| | | | |
|---|---|---|---|
| EP | 919999 | A2 * | 6/1999 |

* cited by examiner

THERMAL PRINTER

CROSS-REFERENCE TO RELATED APPLICATIONS

This application is a continuation-in-part of commonly assigned U.S. patent application Ser. No. 10/272,325, filed Oct. 15, 2002 now U.S. Pat. No. 6,887,313.

FIELD OF THE INVENTION

The invention generally relates to a marking system and method for marking indicia on a markable medium, and more particularly to an in-line marking system for marking indicia on mediums such as compact disks, DVD's, computer chips, or any medium having a markable or printable surface.

BACKGROUND OF THE INVENTION AND BRIEF DESCRIPTION OF THE RELATED ART

The marking of mediums reflects the content of the medium and allows the dissemination of information wherein the end user can identify the subject matter located within the medium. In addition, logos, trademarks, text, graphics, and bar codes can be added to the medium for marketing, sales and cataloging of information.

The printing processes for printing information and graphics on the surface of a medium including plastic disks or compact disks, generally include a silk screening printing process, a printer utilizing ink jet printing technology, a labeling process or a thermal printing process. However, in any printing process, it is desirable that the pressure against the medium be uniformly applied during the printing process in order to insure the highest quality of printing onto the medium.

One of the most popular types of media are optical disks, such as compact disks and digital video disks, or digital versatile disks. The optical disk or CD has recently become a popular form of media for storing digital information, recording high quality audio and video information and also for recording computer software of various types. With advances in technology, it is now possible not only to read information from such optical media, but also to record digital information directly onto the media. For example, recordable compact disks (referred to as CD-Rs) may have digital information recorded on them by placing the CD-R into a compact disk recorder that receives the digital information from a computer. Such forms of optical media are thus particularly useful for data distribution and/or archiving.

Compact disks are standardized in two sizes and configurations, one having an overall diameter of 4.72 inches, a central hole of 0.59 inches, and a central region about the center hole of 1.50 inches in diameter, wherein no information is either printed or recorded. The other standard disk size is 3.5 inches in overall diameter, with a comparable central hole size and central region. In the case of disks for utilization in connection with computer processors, the recording formats and content are typically adapted to the particular generalized type of computer processor with which the disk is to operate. Some compact disks are recorded in such a way as to be usable with several different computer processor types, i.e., PC, Macintosh, etc.

The significant increases in use of CD disks and CD-R disks as a data distribution vehicle has increased the need to provide customized CD label content to reflect the data content of the disk. Initially, the customized label information was "hand written" on the disk surface using felt tipped markers. While this approach permitted users to individually identify disks, it tends to be labor intensive, prone to human error in transcription, and aesthetically limited.

Other attempts to provide a CD or CD-R labeling solution have incorporated digitally printed adhesive labels. Precut labels are printed using desktop or commercial ink-jet, thermal wax transfer, or printers. An example of such labels is the STOMP Company's (Irvine, Calif.) CD Stomper package of die cut CD labels that can be printed on any 8.5 by 11 inch ink jet or laser electrophotographic printer. Following printing, the labels can be applied manually with or without the aid of an alignment tool or a specially designed machine. This method can be labor intensive, and the CD-R can be damaged if the label is removed. In addition, system performance problems can occur due to disk imbalance or label de-lamination in the CD writer or reader.

Within the past several years, however, methods for direct CD labeling have been growing in prominence. These methods utilize the versatility and ease of the setup associated with digital printing to provide customized label content directly on a disk surface. The most commonly used direct CD printers incorporate ink jet or thermal wax transfer technologies. These printers can be either stand alone or integrated into a computerized disk writing system reducing problems associated with labor, human error, disk damage, and imbalance.

CDs are often coated with a printable surface opposite to the surface from which the information is recorded and retrieved. On the printable surface, a label is printed which can be logos, trademarks, text, graphics, and bar codes, etc., which are related to the information stored on the CD. The label also protects the CD from physical damage. Because the CD spins at high speed in the writer and the player, the CD labels needs to be precisely balanced to the center of the disk for smooth rotation.

Labeling of CD disks has routinely been accomplished through screen-printing methods. While this method can provide a wide variety of label content, it tends to be cost ineffective for run lengths less than 300-400 disks because the fixed cost on unique materials and set-up are shared by all the disks in each run. The screen printing technique is well described in the textbook "Graphic Arts Manual", edited by Janet and Irving Field, Arno/Musarts Press, New York, N.Y., 1980, pp. 416 to 418. In screen printing a stencil of the image is prepared, placed in contact with the CD and then ink is spread by squeegee across the stencil surface. Where there are openings in the stencil the ink passes through to the surface of the CD, thus producing the image. Preparation of the stencil is an elaborate, time consuming and expensive process.

However, since compact disks are an inexpensive medium for storing digital information that may relate to audio, video and/or any type of information or data that is conveniently stored in digital form that in order to appropriately label such media with regard to the content that is recorded on the disk, programmable disk printers, such as ink jet printers and thermal transfer printers have been devised. These printers print the surface of the disk with graphics and other information that can be customized to correspond to the information recorded on the disk by the CD-R recorder.

An advantage of thermal transfer printers is the ability of the print engine to print with greater speed than a typical ink jet printer or labeling process. In addition, a thermal printer can print on disks prepared with an inexpensive lacquer coating. A typical thermal transfer printer includes a print head that applies a contact pressure to the media to be printed.

One type of thermal transfer printer will typically consist of a mechanism that has a stationary print head, a ribbon, and assembly that moves the media under the print head. The print head contains an array of heating elements. The ribbon is a plastic film with a wax or resin compound deposited on one side. The print head is in contact with the ribbon during printing, and the ribbon is in contact with the media.

By heating the areas of the ribbon, the wax or resin compound is deposited on the media. Printing occurs by moving ribbon and the media at the same rate across the print head, while firing the heating elements in a desired pattern. The print head must exert some pressure on the media for successful transfer of the wax or resin to the media.

A second type of thermal printer is a direct transfer printer, which uses thermally sensitive media that changes color when heated, therefore a ribbon is not required. With thermally sensitive media, the print head marks the media by generating a pattern of heated and non-heated areas on the surface of the media, as it moves under the print head.

Thermal transfer printers require the print head to contact the printable surface at a uniform pressure for optimum transfer of a marking medium from a ribbon to the media (or heat in the case of direct thermal transfer printer). However, any variation in print head pressure to the media can result in improper printing on media such as non-printed areas or uneven print density.

Printing on rectangular objects, such as a piece of paper, is relatively straight forward, since the print head pressure remains constant during the entire printing process. The pressure remains constant because the area of contact between the print head and the media does not change. For example, in printing a 5" wide piece of paper the print head is always in contact with 5" of media. In contrast, printing on a 5" diameter disk, the area of contact would initially be very small as the print head is at the edge of the disk, but then increases to 5" as the print head crosses the center of the disk. After crossing the center of the disk, the area of contact decreases as the print head travels the far edge of the disk.

When the force of the print head applied to the media is constant and the print head travels across a rectangular shaped media, the pressure per unit area is constant. If the print head travels across a disk shaped media, the print head pressure to the media will change as the print head travels across the disk. When the force of the print head applied to the media is constant and the print head travels across a disk shaped media the pressure per unit area changes as the contact area increases and decreases.

Thermal transfer printer generally includes any transfer of an imaging compound, such as a wax, wax resin or wax resin composite, or a dye from a carrier ribbon, film or web to a substrate, as shown, a disc shaped substrate such as a compact disc (CD) or digital versatile disc (DVD). The velocity of movement of the compact disc is varied along with a platen position and engagement force to efficiently use available power so as to compensate for the changing power required by the print head for printing differing print line lengths and also space the print head from raised rims around the central opening of DVD'S.

Typically, the technology for printing onto CDs utilizes expensive head actuating and force modifying mechanisms. The print head is moved on pivotally mounted arms that extend substantially beyond the envelope of the print head, with a linearly driven carriage that has to hold the disk over a flat resilient surface with a clamping device that moves with the carriage. In addition, the threading of the print ribbon through the print head and mounting ports can be of the presently available printers can be difficult and includes taping the ribbon to the carriage, then taping the ribbon after the carriage is driven into the printer. This leads to large, high-cost thermal transfer CD, CD-R and DVD printers. It is desirable to substantially reduce the size in order to take less space for the CD printers, as well as manufacturing costs and user interaction.

Conventional techniques for thermal printing onto circular objects, such as a CD disc, cause the circular object to be printed to pass beneath a thermally activated print head at a uniform rate of speed. It can be appreciated that by varying the speed at which the circular object passes beneath the print head to manage the power needed for the printing process and varies the force on and position of the disk as a function of the position of the disk under the print head. This permits the printer to utilize a non-dedicated and limited power source, such as a personal computer power supply and also to reliably print on DVDs which have a raised rim around the center portion of the disc.

Typically, the ink jet label printing requires a hydroscopic coating on the CD surface for accepting aqueous ink solutions. The thermal wax transfer can print on a lacquer (shiny), matte, or silk-screened disc surface. Both printing techniques, though, are bi-model in nature and are therefore not suitable for printing continues tone photographic images.

Many users want to print photographs on the labeling surface of the CDs. This is especially desired for photo CDs, where thumbnail images can be printed on the label as an index of the images stored in the CD. A photographic image is best printed with a continuous-tone printer, rather than bi-model printer such as ink jet or thermal wax transfer printers.

Accordingly, what is desired is an in-line marking system comprising a thermal printer, which marks indicia on the disk in an efficient and expedient manner.

SUMMARY OF THE INVENTION

In accordance with one embodiment, a thermal printer comprises a dispenser configured to dispense a medium from a stack of mediums; a conveyor belt assembly configured to receive the medium from the dispenser and convey the medium from a first position to a second position; a thermal printer located between the first position and the second position and configured to mark indicia on the medium; and at least one sensor configured to position a print head of the thermal printer on an upper surface of the medium during the marking process.

In accordance with a further embodiment, a thermal transfer printer comprises a dispenser configured to dispense a disk from a stack of disks; a conveyor belt assembly configured to receive the disk from the duplication system and convey the disk from a first position to a second position; a thermal transfer printer located between the first position and the second position and configured to mark indicia on the disk, the thermal transfer printer comprising a thermal print head and a thermal ribbon; and at least one sensor configured to position the thermal ribbon on an upper surface of the disk.

In accordance with another embodiment, a method of writing and marking a medium comprises dispensing a disk from a bottom of a stack of mediums onto a conveyor belt assembly; conveying the disk on the conveyor belt assembly from a first position to a second position; and printing indicia on the mediums as the medium is conveyed from the first position to the second position.

BRIEF DESCRIPTION OF THE DRAWINGS

The invention will now be described in greater detail with reference to the preferred embodiments illustrated in the accompanying drawings, in which like elements bear like reference numerals, and wherein.

DETAILED DESCRIPTION OF THE PREFERRED EMBODIMENTS

This invention provides a system and method for marking indicia on a markable medium including optical media, such as compact disks, CD-Rs, CD-RWs, digital video disks or digital versatile disks, computer chips, paper products, and paper like products. The system and method provide for the marking of a large number of media in an efficient and expedient manner. The in-line marking system may be used as part of or in conjunction with systems for handling, printing, duplicating or replicating of markable mediums.

Figure 1:
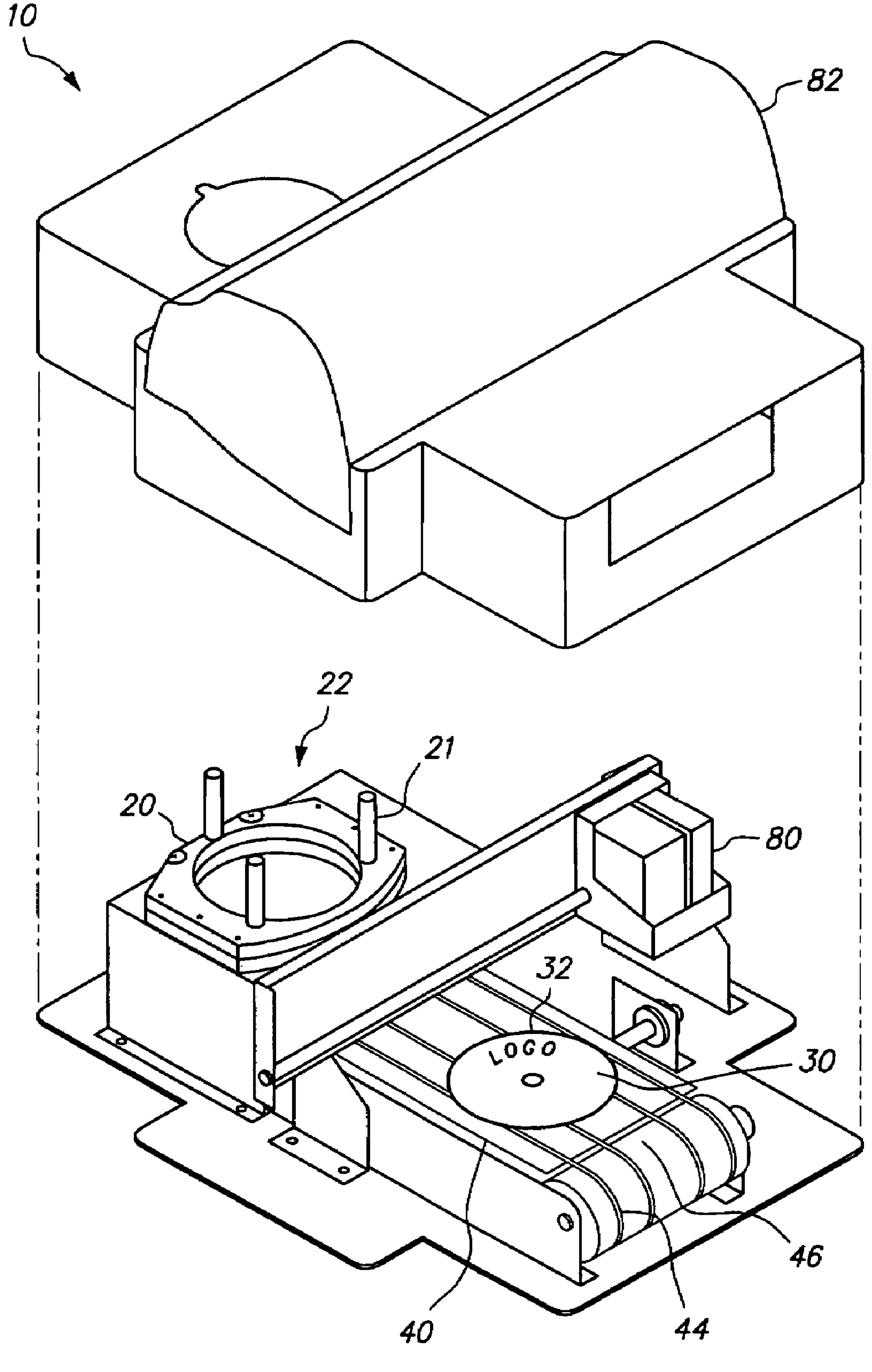
FIG. 1 is a perspective view of an in-line marking system in accordance with the present invention.

FIG. 1 shows an in-line marking system, generally designated with the reference numeral 10. The system 10 includes a dispenser 20, a conveyor belt assembly 40, a marking device 80 and a cover 82.

The dispenser 20 dispenses a markable medium 30 from a housing 22 onto the conveyor belt assembly 40. The conveyor belt assembly 40 receives the medium 30 from the dispenser 20 and conveys the medium 30 from a first position to a second position. The conveyor belt assembly 40 has a plurality of belts 44 forming a conveyor surface 46. A marking device 80 located between the first position and the second position marks the medium 30 with indicia 32. The indicia 32 can include names, logos, trademarks, text, graphics, bar codes, designs or any other descriptive or unique marking to identify or associate the medium with a manufacturer or for identification of the content of the medium, marketing, sales and cataloging of information.

The marking device 80 will preferably be a silk screen printer, a printer utilizing ink jet printing technology, a labeling process, or a thermal printing process. However, it can be appreciated that the marking device 80 can be a duplicating or a replicating device.

The cover 82 prevents the dispenser 20, the conveyor belt assembly 40 and the marking device 80 from being damaged during transportation or use and further prevents dust and other particles from collecting on the dispenser 20, conveyor belt assembly 40, or marking device 80.

Figure 2:
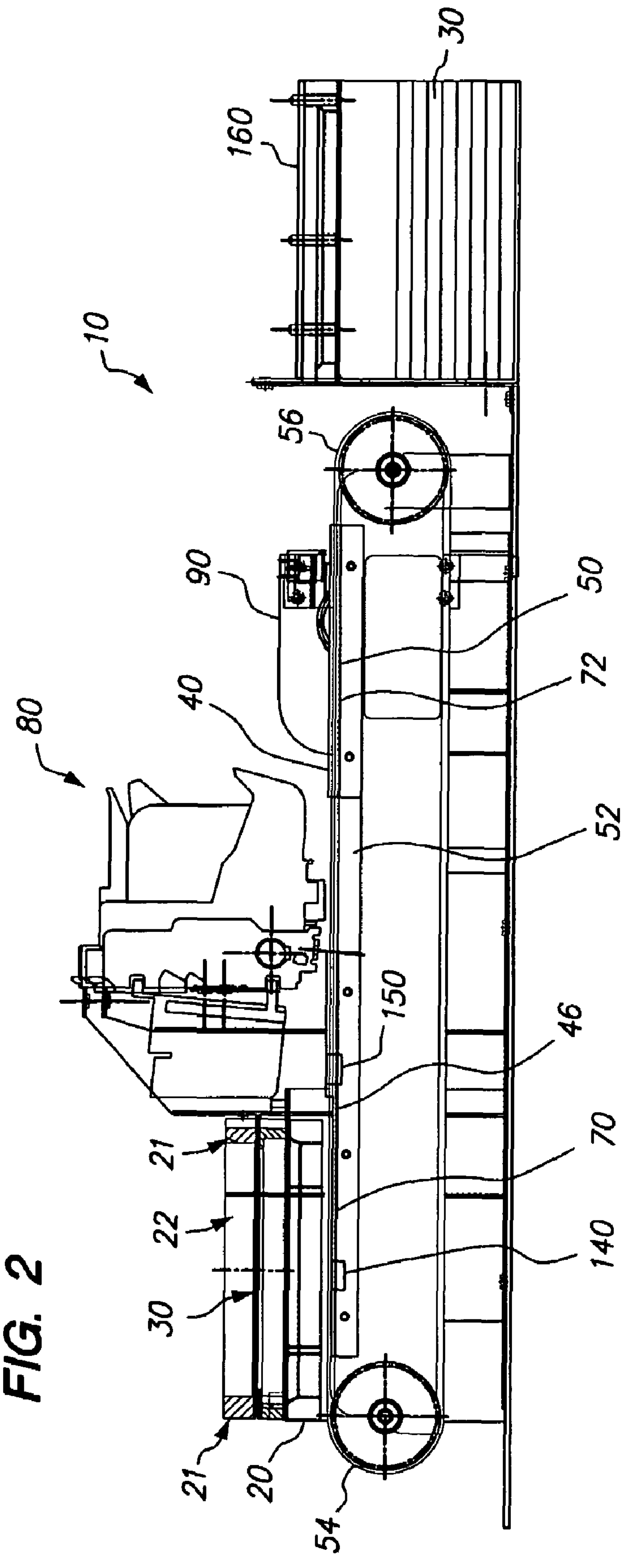
FIG. 2 is a side elevation view of the in-line marking system of FIG. 1.

FIG. 2 shows a side elevation view of the in-line marking system 10 of FIG. 1. As shown in FIG. 2, the in-line marking system includes the dispenser 20 for dispensing the markable medium 30 onto the conveyor belt assembly 40. The belts 44 of the conveyor belt assembly 40 are looped around a first roller 54 and a second roller 56.

The dispenser 20 dispenses the markable medium 30 onto the conveyor belt assembly 40 from the housing 22. The housing 22 attaches to the dispenser 20 and includes a plurality of posts 21 for holding a plurality of mediums 30. The dispenser 20 is located over the conveyor belt assembly 40 such that the medium 30 is individually dispensed onto the conveyor belt assembly 40. The dispenser 20 dispenses the medium 30 at a predetermined interval or alternatively, the medium 30 can be dispensed at variable intervals. The dispensing of the medium 30 onto the conveyor belt surface 46 is controlled by a microprocessor 120 and a first sensor 140. The first sensor 140 is preferably located beneath the disk dispenser 20. However, it can be appreciated that the first sensor 140 can be located anywhere on the system 10 as long as the sensors can control the dispensing of the medium 30 onto the conveyor surface 46.

Although only a single housing 22 is shown in FIG. 2, the present invention is intended to mark a multitude of mediums 30, such that, multiple housings or a conveyor fed system to the dispenser can be used. For example, the housing 22 can hold mediums 30 in groups of 25, 50, 100 or even 150 at a time.

In one embodiment, the dispenser 20 is a dispenser as described in Wolfer et al., U.S. Pat. No. 6,135,316, which is incorporated herein by reference in its entirety. The dispenser 20, as disclosed in U.S. Pat. No. 6,135,316, dispenses a medium 30 from the bottom of a stack of mediums 30 having an upper guide, a lower guide and a plate slidably mounted between the upper guide and the lower guide. The upper guide and lower guide define an opening, wherein the plate slides to dispense the medium 30 through the lower guide opening. However, it can be appreciated that the dispenser 20 can use pick and place technology or any other known method for dispensing a disk or medium 30 onto a conveyor belt assembly 40.

In a preferred embodiment, the markable medium 30 includes optical disks or magnetic memory storage media including compact disks, CD-Rs, CD-RWs, digital video disks or digital versatile disks, and the like. However, a variety of media including optical or magnetic memory storage media can be dispensed and marked or duplicated in accordance with the present invention. In addition, as will be recognized by one skilled in the art and as set forth above, the markable medium 30 can be of any desired shape and size.

Generally, the marking device 80 for printing information and graphics on the surface of a medium 30, particularly compact disks, will include one or more of the following devices or printing processes: a silk screening printer, a printer utilizing ink jet printing technology, a labeling process or a thermal printing process. The marking device 80 is preferably interchangeable, such that more than one type of marking device 80 can be used with each in-line marking system 10. For example, the marking device 80 is preferably interchangeable such that it will accommodate a print engine, or a duplicator. Alternatively, the system can be designed for a single marking device 80. However, in any marking device 80, it is desirable that the pressure against the medium be uniformly applied during the marking (or printing) process in order to insure the highest quality of marking onto the medium 30.

In addition, it can be appreciated that any commercial available print engine, such as those manufactured by Lexmark, Hewlett-Packard or Compaq can be used as a marking device 80. The indicia 32 information will preferably be delivered to the marking device 80, via a computer or microprocessor, such as a commercially available Pentium-type processor or any other known processor. According to one variation of the invention, the marking device 80 is a CD printer for printing indicia on disk surfaces and the dispenser 20 dispenses disks to the CD printer.

The marking device 80 is located between a first position 70 and a second position 72 of the in-line marking system 10. The marking device 80 is located above the conveyor belt assembly 40 and marks indicia 32 on the medium 30. In addition, it can be appreciated that the marking device 80 can include a duplicating and/or a replicating device for producing multiple copies of the medium. For example, with optical disks, as will be recognized by one skilled in the art, the marking device could include a disk writer or any other known optical disk duplicator.

The first roller 54 is located nearest the dispenser 20 and is preferably a free wheel. However, it can be appreciated that the first roller can also be a fly wheel or balance wheel. The first roller 54 rotates with the movement of the conveyor belt 44.

The second roller 56 is located nearest the marking device 80 and is driven by a conventional drive gear and DC motor assembly 90 to incrementally advance the second roller 56 in response to the rotation of the motor. The second roller 56 is also preferably a flywheel, however, it can be appreciated that the second roller 56 can be a balance wheel, or any other type of wheel capable of being driven by the motor assembly 90. The rollers 54, 56 are preferably made of aluminum or molded plastic. However, almost any material, including steel, wood, or rubber can be used, as long as the rollers 54, 56 has appropriate friction to rotate the conveyor belt assembly 40 and conveyor belts 44.

As shown in FIG. 2, the in-line marking system 10 has a receptacle 160 for receiving the medium 30 after marking of the medium 30 with indicia 32. The receptacle 160 can be a basket, a hopper with a spring loaded basket, or any other suitable device for receiving the medium 30 from the conveyor belt assembly 40. Alternatively, the receptacle 160 can be an upstacker (as shown in FIGS. 9 and 11-13) as disclosed in Wolfer et al., U.S. Pat. No. 6,337,842, and U.S. patent application Ser. No. 09/828,569, filed on Apr. 5, 2001, which are incorporated herein by reference in their entirety.

Figure 3:
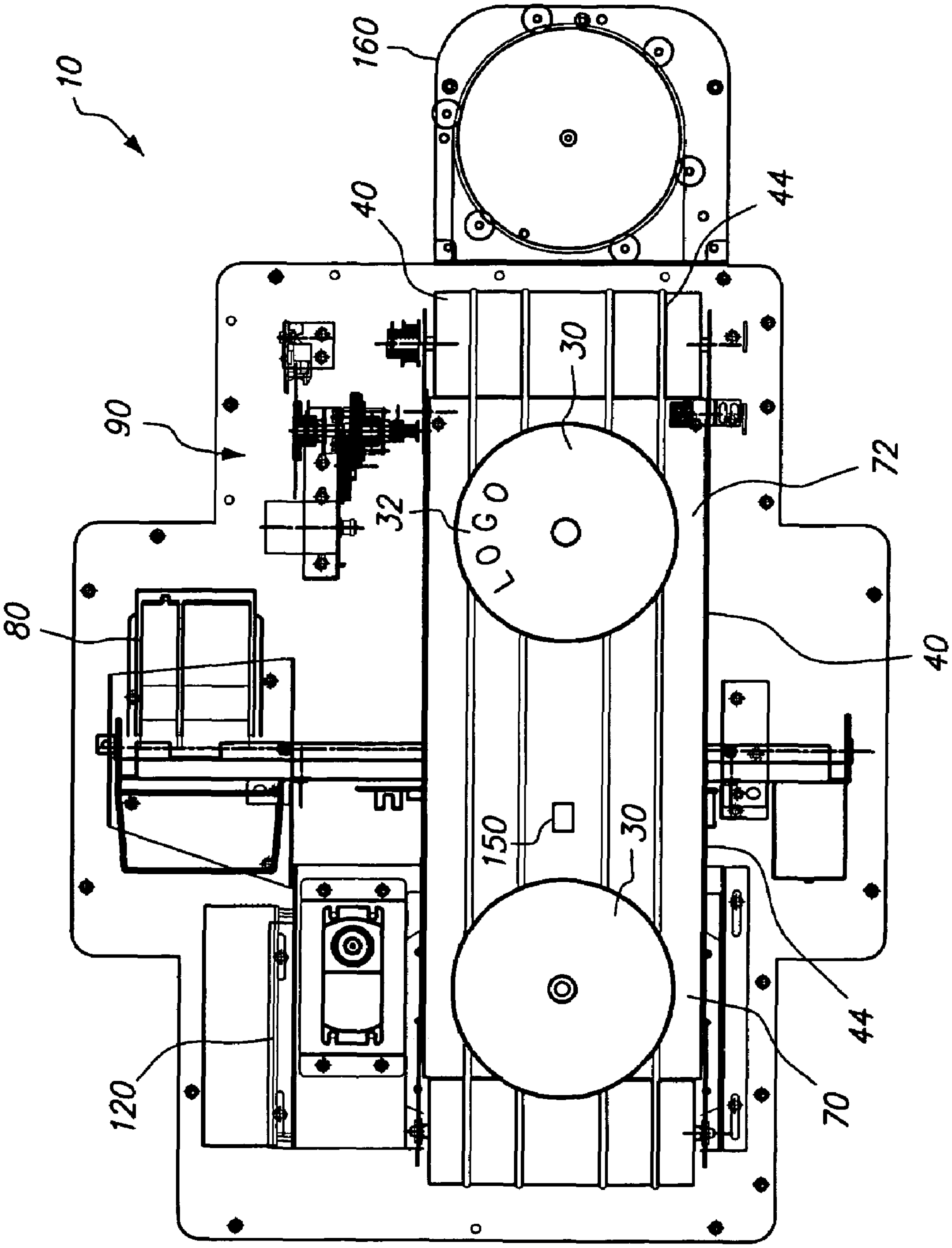
FIG. 3 is a top view of the in-line marking system of FIG. 1.

FIG. 3 shows a top view of the in-line marking system 10 of FIG. 1. In addition to the disk dispenser 20, the conveyor belt assembly 40, the marking device 80, the first sensor 140, and the receptacle 160 for accepting the mediums after marking, the in-line marking system 10 includes a microprocessor 120 that receives instructions from a host device, typically a computer, such as a personal computer (not shown), or can be programmed internally. It can be appreciated that the microprocessor 120 can be a microcomputer or loader board.

The motor assembly 90 drives the conveyor belt assembly 40 via the second roller 56 (as shown in FIG. 2) by rotating a gear drive in short and essentially uniform angular movements. The motor assembly 90 operates according to a predetermined acceleration and velocity profile that is controlled by an algorithm programmed in the microprocessor 120, or alternatively in response to control signals received from the microprocessor 120. The predetermined acceleration and velocity profile ensures that the speed of the conveyor belt assembly 40 and the marking device 80 are equal, which allows the marking device 80 to mark the medium 30 in one continuous movement. The marking device 80 marks the medium 30 as the medium 30 moves from the first position 70 through the marking device 80 to the second position 77. Thus, this avoids the necessity of having to stop and start the conveyor belt assembly 40 for each and every medium 30.

In a preferred embodiment, the motor assembly 90 includes a gear reduced, DC motor. However, it can be appreciated that the motor assembly 90 can include a magnetic stepper motor, servo motor, a stepper motor, step-servo motor, or any other means which controls the conveyor belt assembly 40 in short and essentially uniform angular movements.

The microprocessor 120 directs the dispensing and the marking process of the system 10. The microprocessor 120 controls the dispenser 20, the marking device 80, and the motor assembly 90 and thereby the conveyor belt assembly 40 by receiving a plurality of signals from sensors located throughout the system 10. It can be appreciated that the number of sensors needed varies based on the embodiment, including the type of the disk dispenser 20, and the marking device 80. For example, if the marking device is a duplicating and replicating device for producing multiple copies of the medium 30, the system 10 may require a plurality of sensors rather than one or two sensors.

In operation, the first sensor 140 senses the presence of the medium 30 on the conveyor belt assembly 40 and communicates the presence of the medium 30 to the microprocessor 120. The microprocessor 120 then directs the motor assembly 90 to advance the second roller 56. The second roller 56 rotates causing the conveyor surface 46 to rotate and advances the medium 30 toward the marking device 80. The first sensor 140 is preferably an optical proximity sensor having a light-emitting diode (LED) and a receptor. However, it can be appreciated that the first sensor 140 can be any type of sensor including micro-switches, capacitive sensors, inductive sensors, or magnetic read switches, which recognize the presence of the medium 30 on the conveyor surface 46.

The first sensor 140 is also able to detect the presence or absence of a medium 30 in the dispenser 20. The microprocessor 120 receives a signal from the first sensor 140 and uses this information to determine whether the mediums 30 in the dispenser 20 need to be refilled. If a medium 30 is present in the dispenser 20, a signal is sent from the microprocessor 120 to the dispenser 20 to dispense the medium 30 onto the conveyor surface 46 for marking by the marking device 80.

A second sensor 150 is located on or near the conveyor surface 46 and detects the presence of the medium 30 on the conveyor surface as the medium 30 advances toward the marking device 80. In one embodiment, the second sensor 150 is a flag sensor, which has a pivoting lever, which detects the medium 30 as the medium 30 advances. However, as with any of the sensors of the system 10, the second sensor 150 can be an optical proximity sensor, a micro-switch, a capacitive sensor, an inductive sensor, a magnetic read switch or any other sensor known to one skilled in the art which recognizes the presence of the medium 30 on the conveyor surface 46.

The second sensor 150 sends a signal to the microprocessor 120 to begin the marking process. Once the marking process has been completed, if appropriate, the microprocessor 120 sends another signal to the dispenser 20 to release another medium 30 onto the conveyor surface 46 or alternatively the microprocessor 120 directs the system 10 to cease operation. In addition, the microprocessor 120 controls the movement of the conveyor belts 44 such that the medium 30 is dispensed onto the conveyor surface 46 at the correct intervals.

The conveyor belt assembly 40 conveys the medium 30 from the first position 70 to the second position 72. The movement of the conveyor belt assembly 40 enables the dispenser 20 to dispense another medium 30 onto the conveyor belt assembly 40 without having to interrupt the marking process. Thus, the continuous movement of the conveyor belt assembly increases production over traditional pick and place technology. In a preferred embodiment, the conveyor surface 46 includes a plurality of belts 44 for conveying the medium 30 from the disk dispenser 20 to the marking device 80. However, any type of conveyor system known to one skilled in the art may be used to convey the medium 30 to the marking device 80.

The chassis assembly 50 preferably has a length of between approximately 12 inches and approximately 72 inches, and a width of between approximately 4 inches to approximately 12 inches. The chassis assembly 50 includes a support frame 52 located between the first roller 54 and the second roller 56. The belts 44 preferably will lay flat or planar on top of the support frame 52 of the chassis assembly 50, which ensures a stable and uniform marking process, as the endless belts 44 loop around the first and second rollers 54, 56. The belts 44 move in a continuous loop from the first position 70 to the second position 72 and then back to the first position 70.

The belts 44 are made of a material which is relatively non-stretchable, such as neoprene, a synthetic rubber which is not only extremely resistant to damage caused by flexing and twist, but has outstanding physical toughness such that it will not deform over time. Neoprene is also extremely soft and provides a non-slip surface such that the medium 30 is not harmed as the medium 30 is conveyed from the dispenser 20 through the marking device 80. However, it can be appreciated that the belts 44 can be made of plastic, nylon, rubber, or any other material which will provide the characteristics necessary to allow the marking device 80 to mark the medium 30 without affecting the quality of the marking process.

The belts 44 preferably have a length of between about 24 inches and about 144 inches. In addition, the belts 44 are preferably approximately ⅛ of an inch in diameter and round. However, a rectangular or flat belt can be used, provided the conveyor surface 46 is flat. It is preferable that the medium 30 rests level on the conveyor surface 46 for optimum marking by the marking device 80. Optimally, at least three or four belts are used to define the conveyor surface 46. However, any number of belts can be used to define the conveyor surface 46. Furthermore, the belts 44 can have a diameter from approximately 1/64 of an inch to approximately 1 inch depending on the size of the system 10 and medium 30 being used. The belts are also spaced apart from approximately ¼ of an inch to approximately 2 inches depending on the size of the belts and the medium to be used. For compact disks and other optical media having an overall diameter of 3.5 or 4.72 inches, a belt having a diameter of approximately 1/16 of an inch to approximately ⅜ of an inch is preferred.

Since the medium 30 can include optical disks which are circular in shape, computer chips which are rectangular, or any paper product or like material including plastics, rubbers, Mylar, foils, fabric, metals, or nylons which have a variety of shapes, the conveyor belt assembly 40 and/or marking device 80 is preferably adjustable, such that mediums 30 of different thickness can be marked. Adjustment of the conveyor belt assembly 40 or marking device 80 can be made by any method known to one skilled in the art, including raising or lowering the conveyor belt assembly 40 and/or marking device 80.

Figure 4:
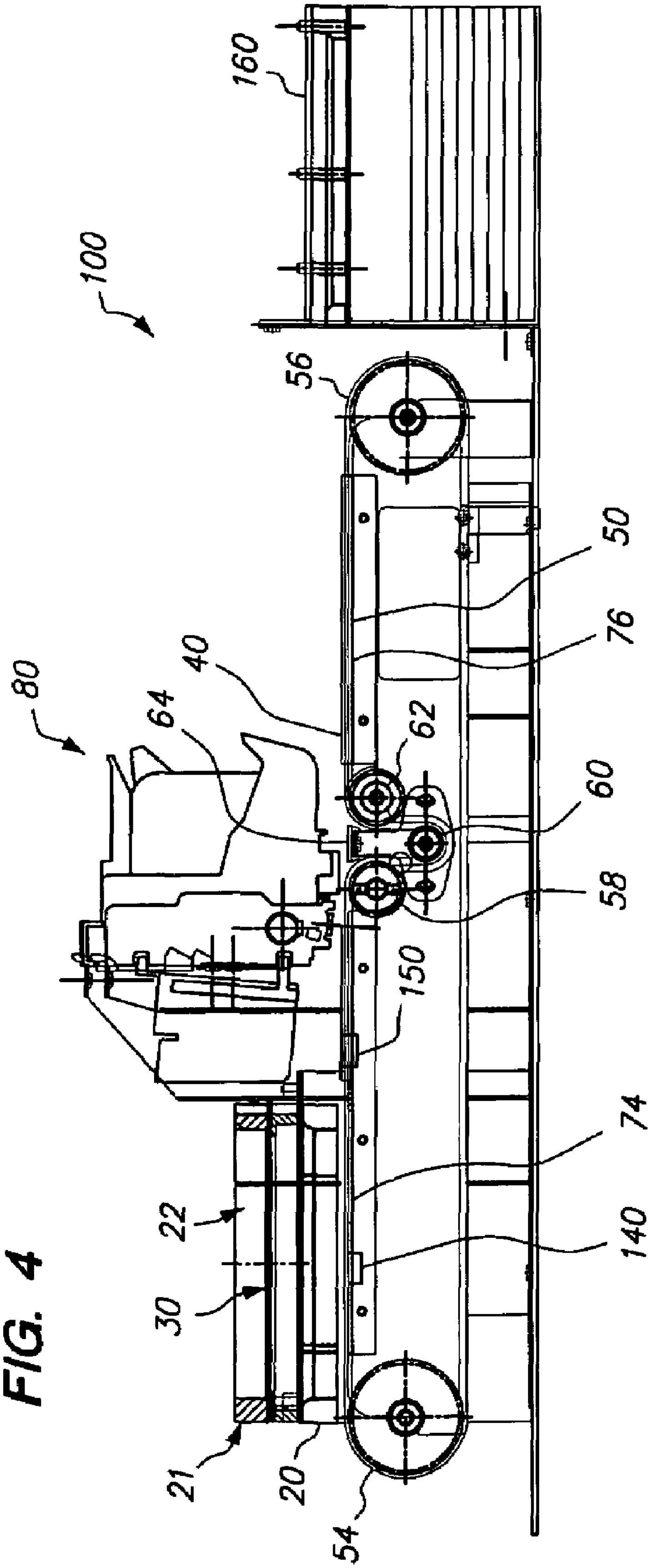
FIG. 4 is a side elevation view of an alternative embodiment of the in-line marking system.

FIG. 4 shows an alternative embodiment of an in-line marking system, generally designated with the reference numeral 100. The system 100 has all of the elements of system 10 of FIG. 1. The system 100 further includes a third roller 58, a fourth roller 60, a fifth roller 62, and a pad 64. The third, fourth, and fifth rollers 58, 60, and 62 guide the conveyor belts 44 around the pad 64 which catches overspray from the marking device 80. In addition, the motor assembly 90, including the drive gear and motor, are coupled to the third roller 58. Accordingly, the movement of the conveyor belt assembly 40 and conveyor belts 44 is controlled by the third roller 58 located beneath the marking device 80, rather than the second roller 56 of system 10.

As the conveyor belts 44 proceed from the first position 70 to the second position 72, at the marking device 80, the third roller 58, fourth roller 60 and fifth roller 62 guide the conveyor belts 44 around the pad 64. The third roller 58 attaches to the motor assembly 90 and controls the movement of the conveyor belt assembly 50 in short and essentially uniform angular movements. The fourth and fifth rollers 60 and 62 are preferably fly wheels. However, it can be appreciated that the fourth and fifth rollers 60 and 62 can be a balance wheel or any type of wheel or device, which guide the belts 44 from the support frame 52 around the pad 64.

The pad 64 is located underneath the marking device 80. The pad 64 or diaper is made of a material such as felt, sponge-like material, or any other material, which will absorb over spray from the marking device 80. The pad 64 will extend the width of the conveyor belt assembly 40 having a length of approximately 10% to approximately 75% of its width. In a preferred embodiment, the pad is replaceable. It can be appreciated, however, that the system 10 can be designed with or without the pad 64 depending on the type of marking device that is used.

Figure 5:
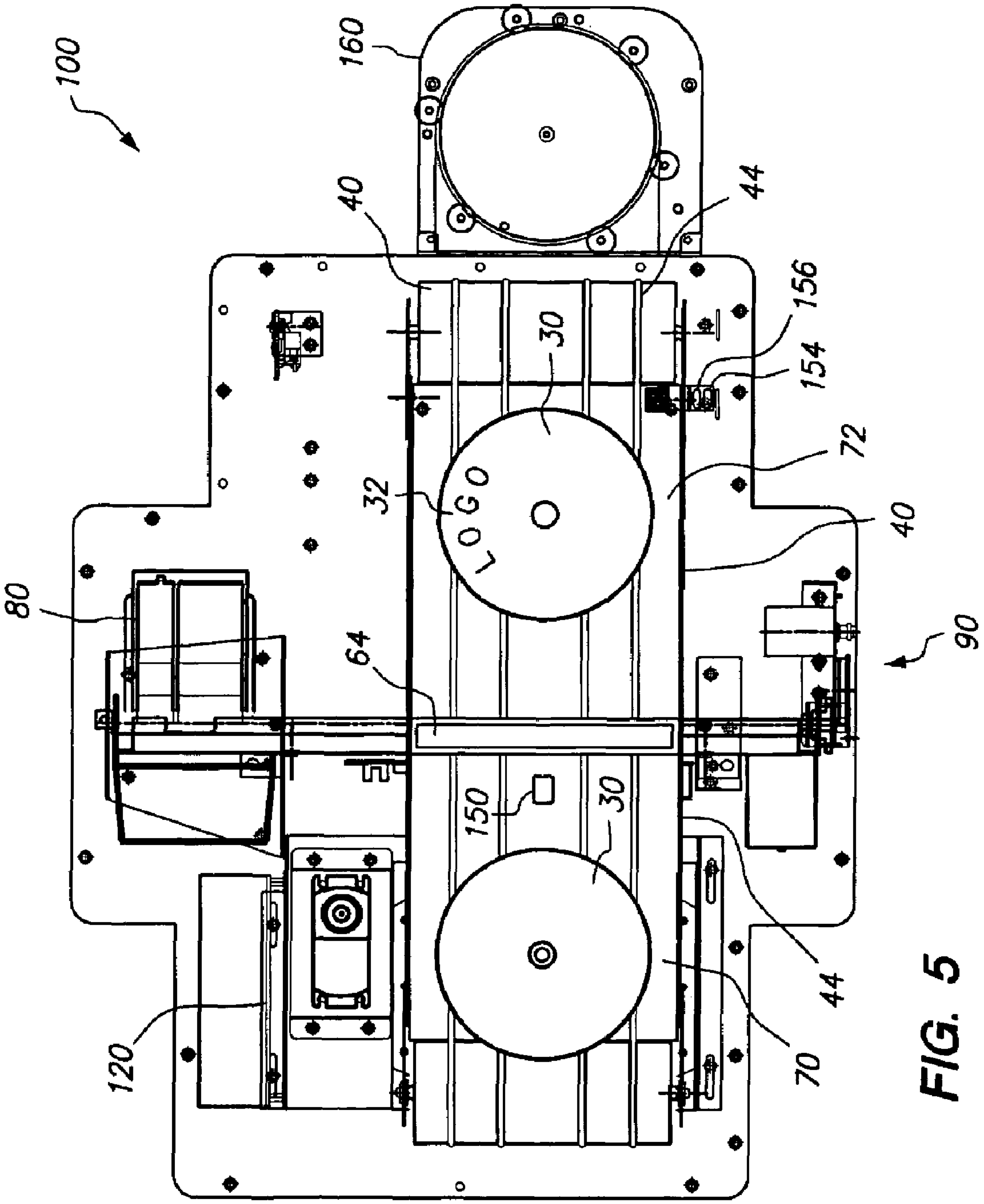
FIG. 5 is a top view of the in-line marking system of FIG. 4.

FIG. 5 shows a top view of the system 100, including the pad 64 and the motor assembly 90. In this system 100, the motor assembly 90 is preferably located adjacent to the third roller 58, rather than adjacent to the second roller 56.

Figure 6:
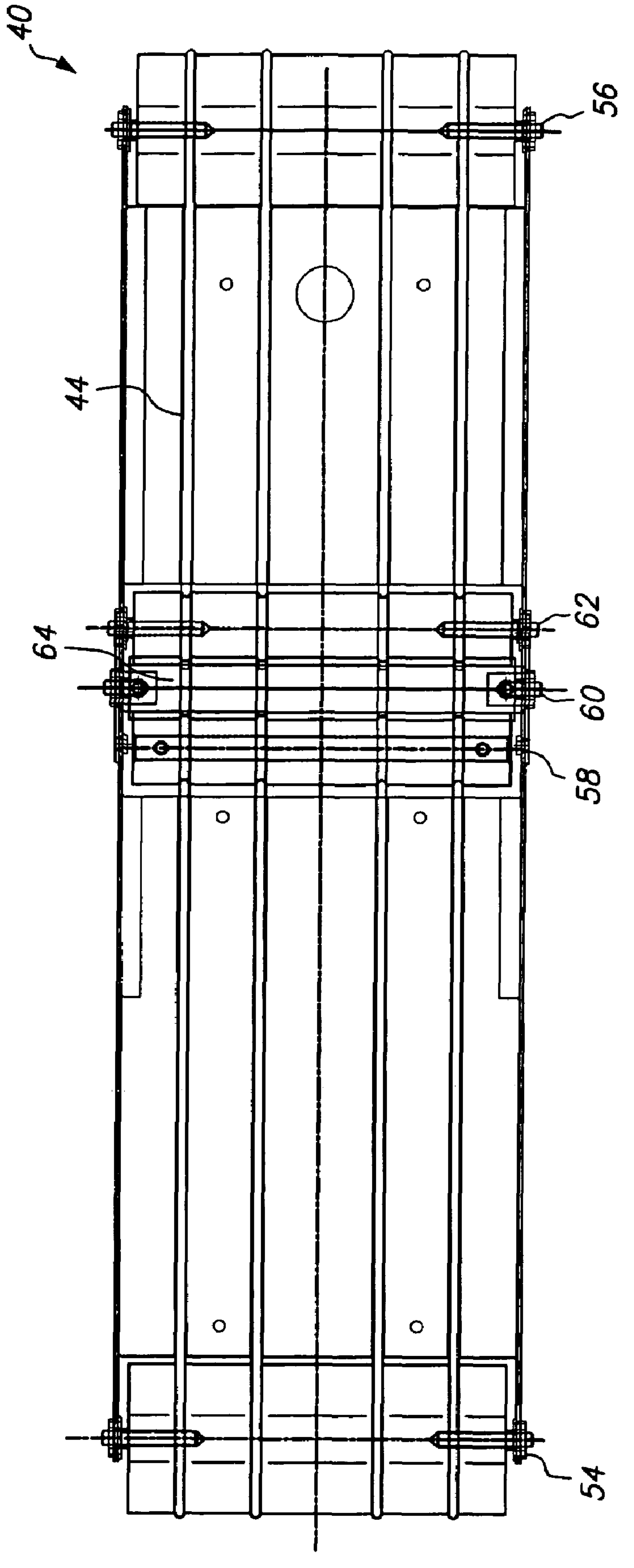
FIG. 6 is a top view of the conveyor belt assembly of the in-line marking system.

FIG. 6 shows a top view of the chassis assembly 50. The chassis assembly 50 includes the plurality of belts 44, the first roller 54, the second roller 56, the third roller 58, the fourth roller 60, the fifth roller 62 and the pad 64.

Figure 7A:
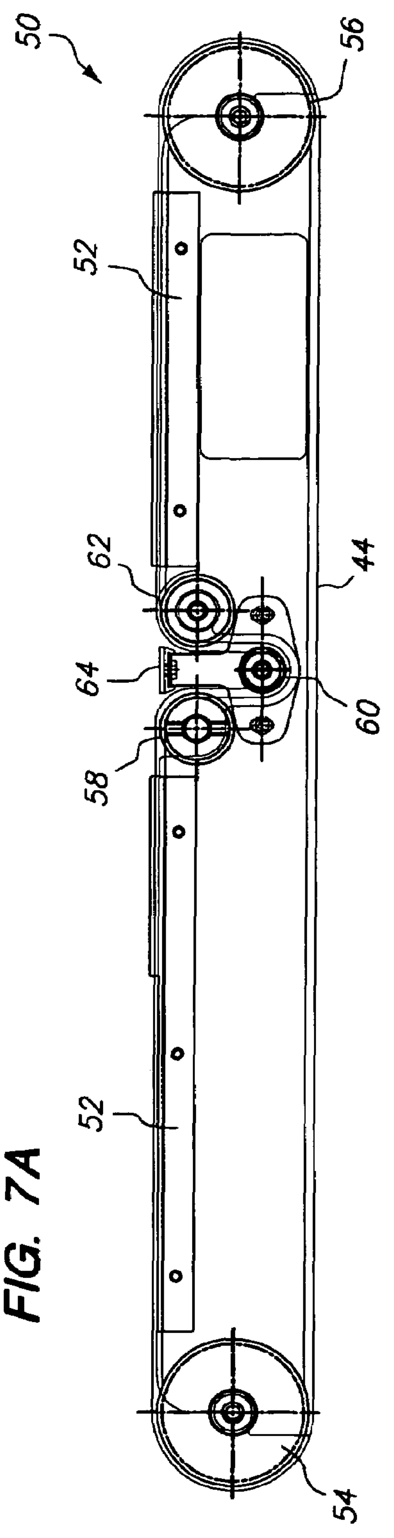
FIGS. 7A and 7B are side elevation views of a conveyor belt assembly of the in-line marking system according to two variations of this invention.

FIG. 7A shows a side elevation view of the chassis assembly 50 including the support frame 52, the first roller 54, the second roller 56, the third roller 58, the fourth roller 60, the fifth roller 62, and the pad 64. The belts 44 preferably will lay flat or planar on top of the support frame 52 of the chassis assembly 50, which ensures a stable and uniform marking process, as the endless belts 44 loop around the first roller 54 and the second roller 56. The support frame 52 is preferably made of two separate sections 74, 76 with the third roller 58, fourth roller 60, fifth roller 62, and the pad 64 located between the two separate sections 74, 76 and the support frame 52. Alternatively, as shown in system 10 (FIG. 2), a single support frame 52 can be used without the third roller 58, the fourth roller 60, the fifth roller 62 and the pad 64.

Figure 7B:
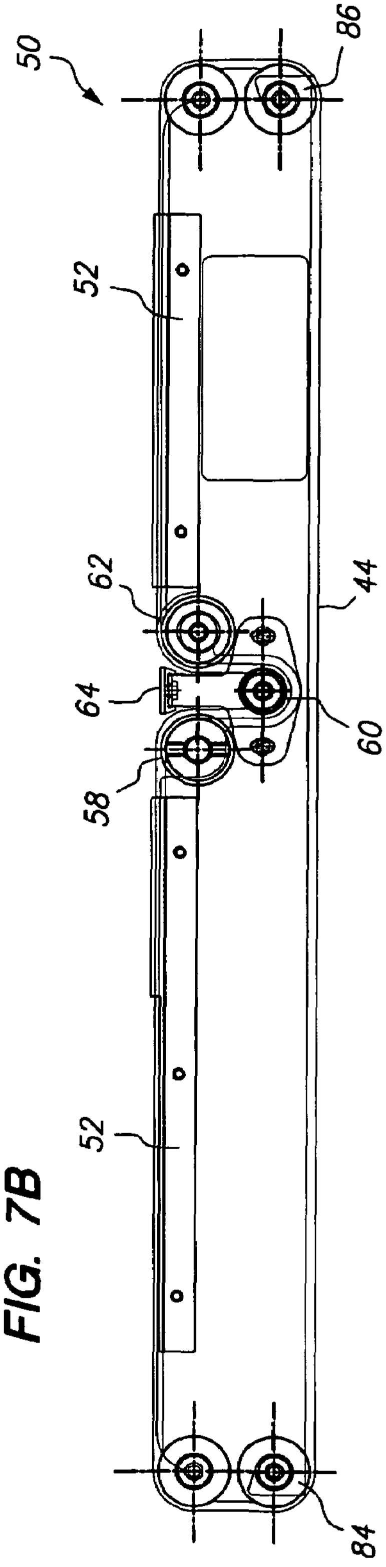

In an alternative embodiment of the chassis assembly 50 as shown in FIG. 7B, the chassis assembly includes the support frame 52, a pair of first rollers 84 and a pair of second rollers

86. Each of the rollers in the pair of first rollers 84 and the pair of second rollers 86 preferably have a uniform diameter for directing the plurality of belts 44 in a continuous loop.

Figure 8A:
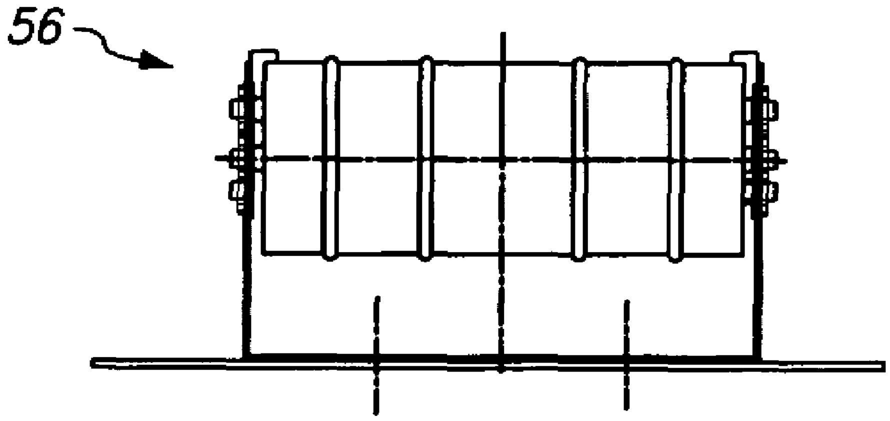
FIGS. 8A and 8B are end elevation views of a conveyor belt assembly of the in-line marking system according to two variations of this invention.
Figure 8B:
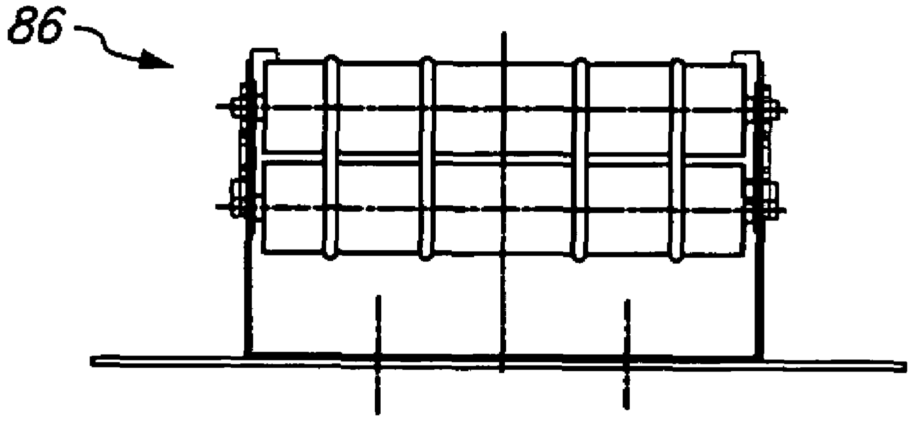

FIGS. 8A and 8B show the alternative embodiments of FIGS. 7A and 7B having a single second roller 56 or pair of second rollers 86, respectively. Each embodiment can be utilized with either system 10 or system 100. It can be appreciated that the size of the rollers and number of rollers can vary depending on the type of marking system.

FIGS. 9-13 show an alternative embodiment of the systems of FIGS. 1-8, generally designated with reference numeral 200. In this embodiment, the system 200 includes a dispenser 210, a housing 230, a conveyor belt assembly 250, a marking device 280, a pad 290, a sensor 310 and a receptacle 330.

Figure 9:
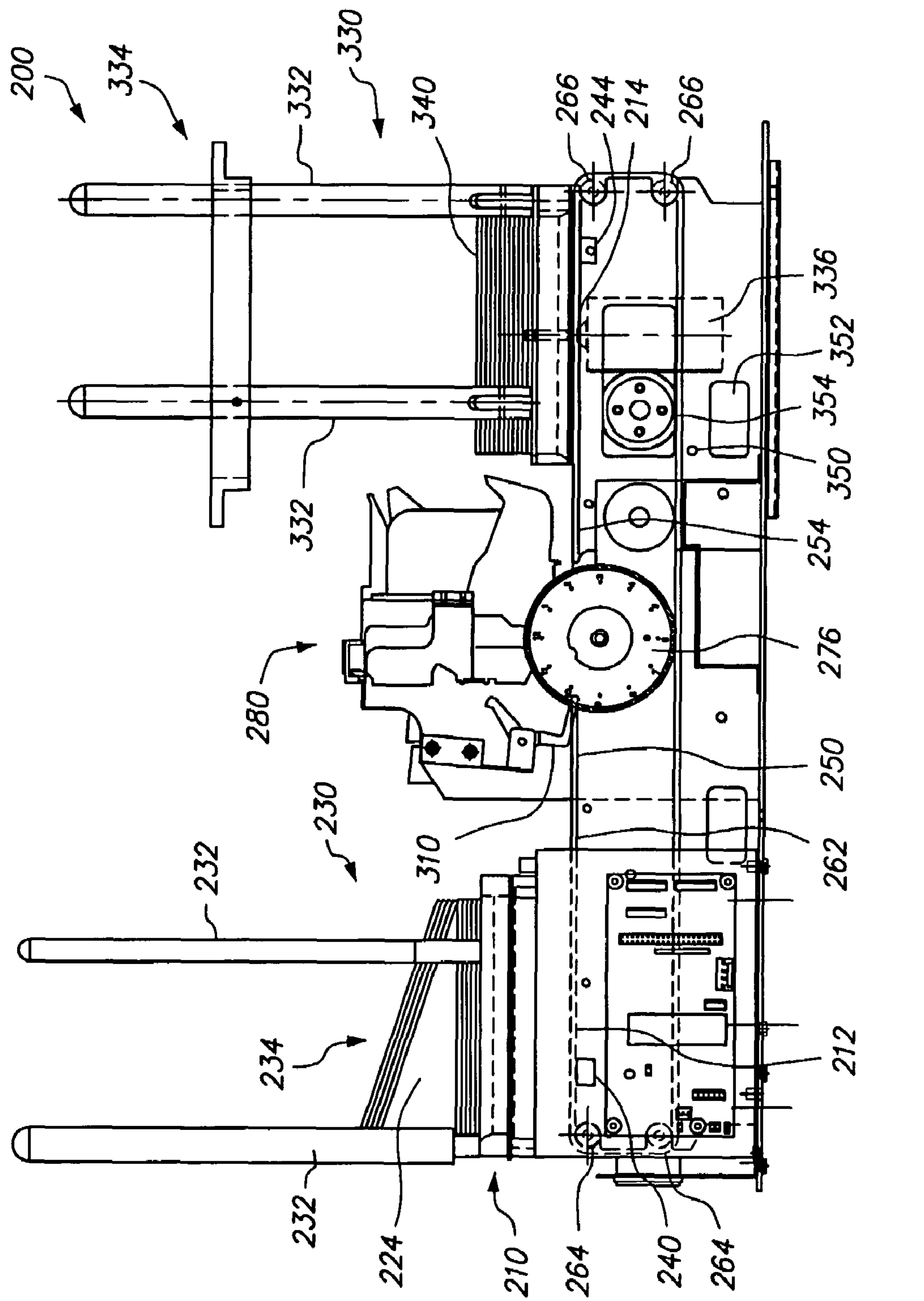
FIG. 9 is a side elevation view of an alternative embodiment of the in-line marking system.
Figure 10:
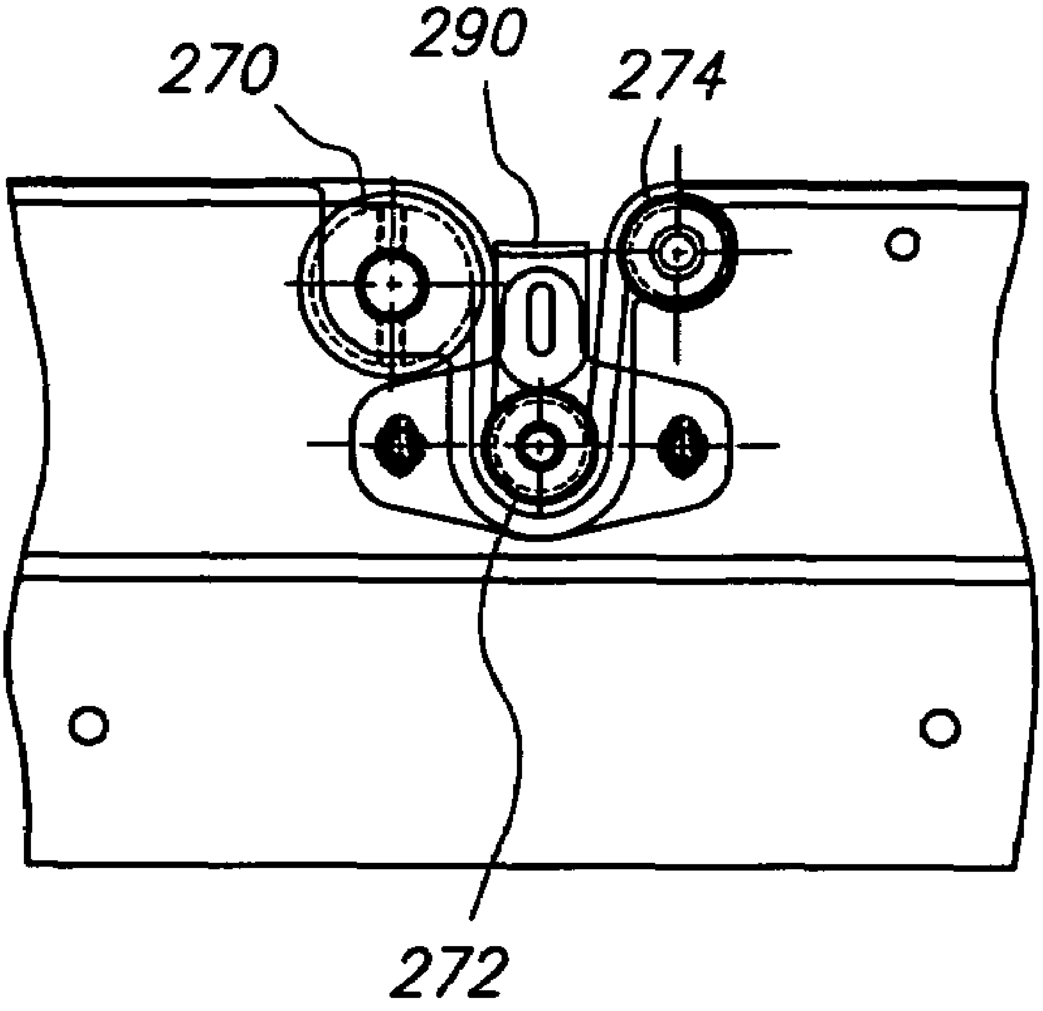
FIG. 10 is a cross-sectional view of the alternative embodiment of the in-line marking system of FIG. 9 along the line 10-10.
Figure 11:
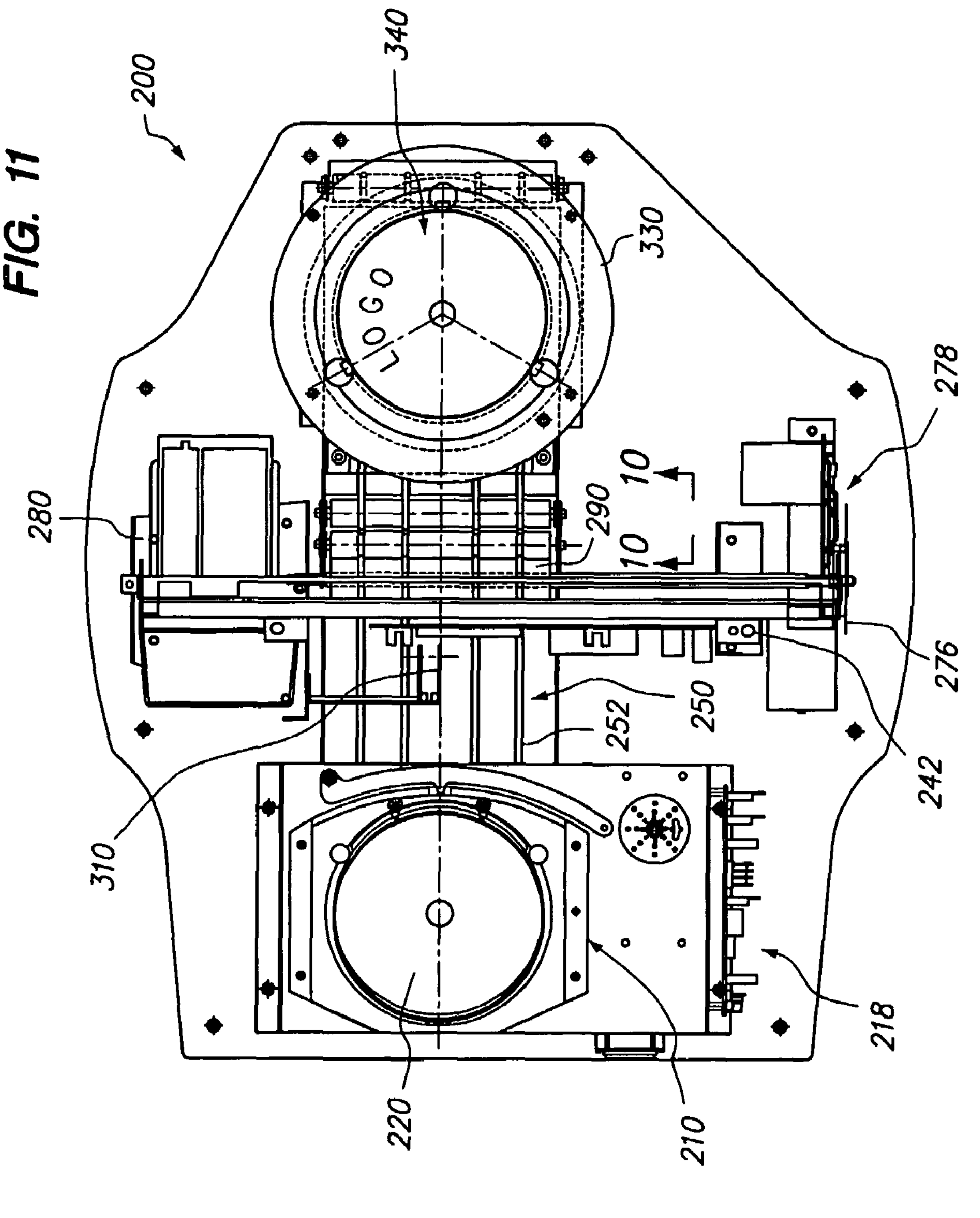
FIG. 11 is a top view of the in-line marking system of FIG. 9.
Figure 12:
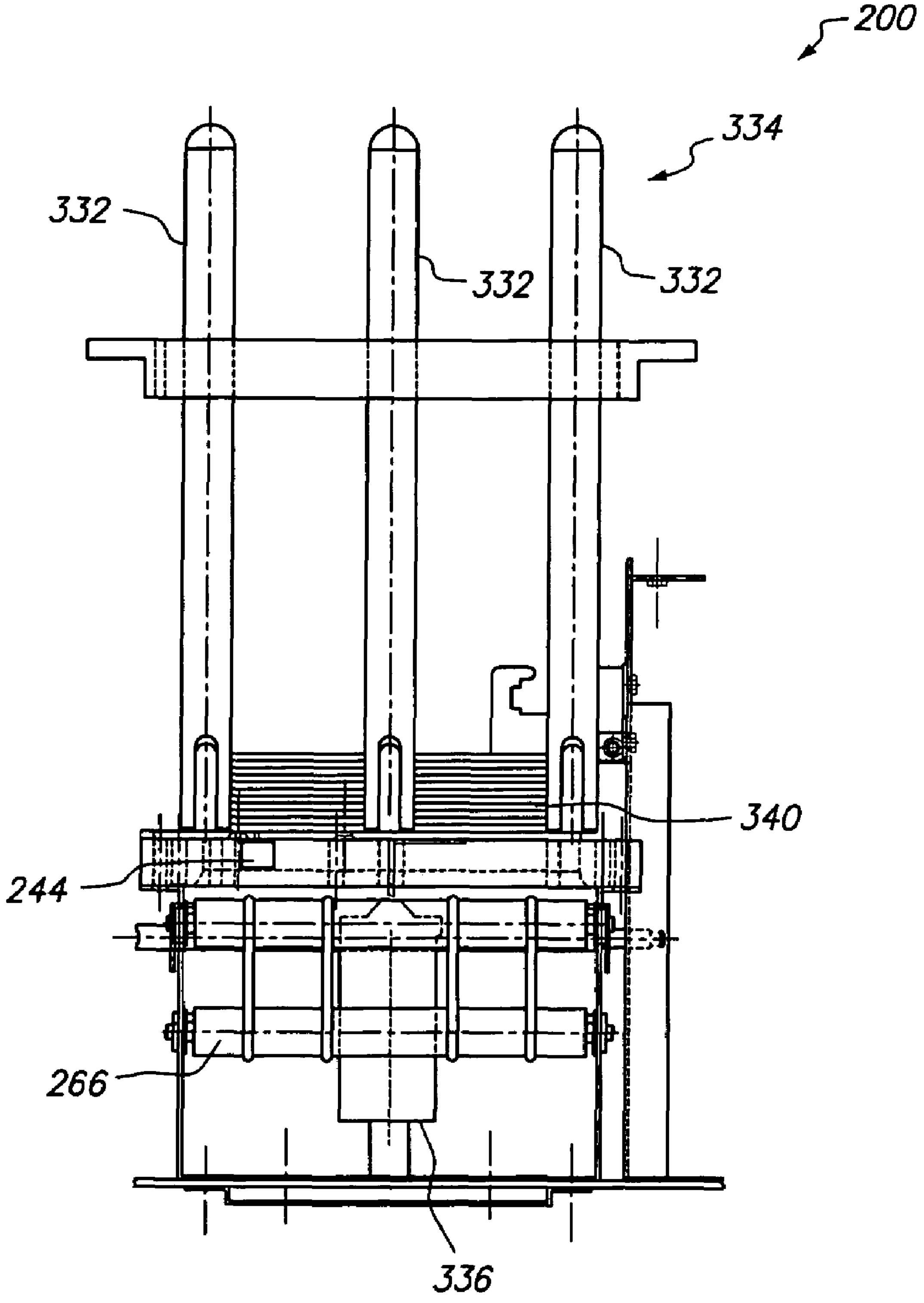
FIG. 12 is an end elevation view of the in-line marking system of FIG. 9.
Figure 13A:
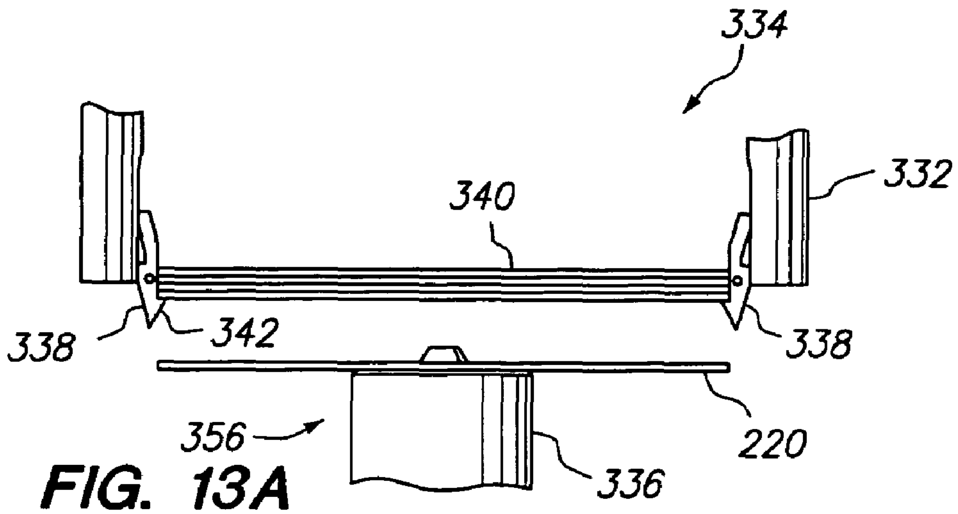
FIGS. 13A-D are elevation views of a receptacle of the in-line marking system of FIG. 9 in operation.
Figure 13B:
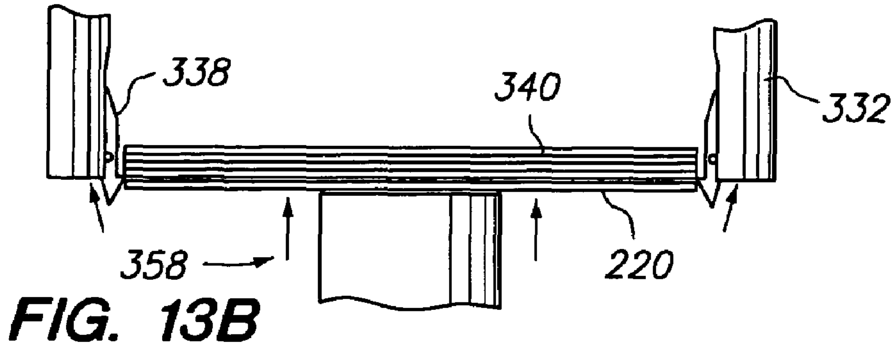
Figure 13C:
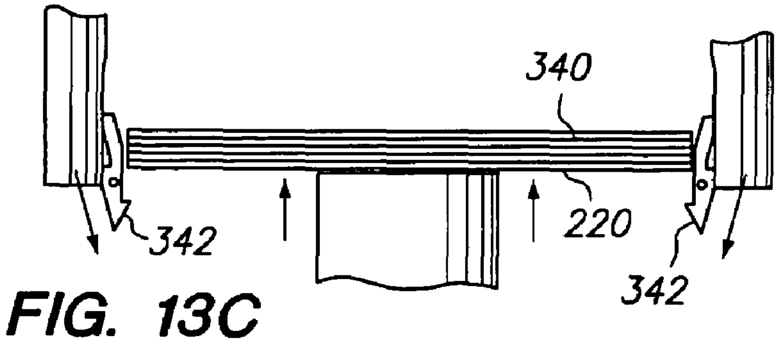
Figure 13D:
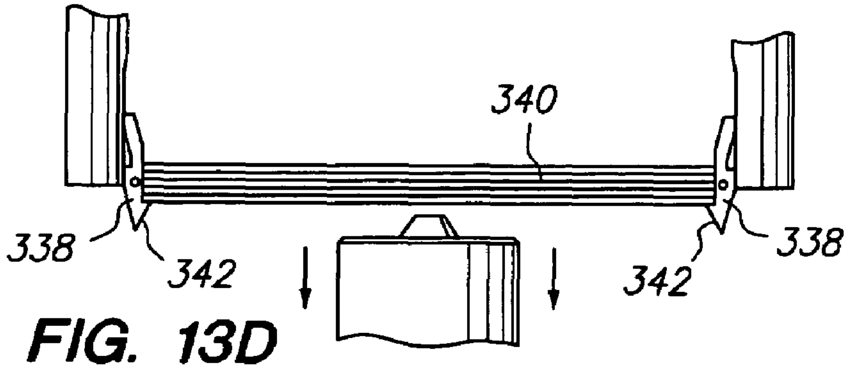

As shown in FIG. 9, the dispenser 210 dispenses a markable medium 220 from the housing 230 onto the conveyor belt assembly 250. The conveyor assembly 250 has a plurality of belts 252 forming a conveyor surface 254. The conveyor belt assembly 250 conveys the medium 220 on the conveyor surface 254 from a first position 212 to a second position 214. A marking device 280 located between the first position 212 and the second position 214 marks the medium 220 with indicia 222.

The dispenser 210 receives the markable medium 220 from the housing 230. The housing 230 includes a plurality of posts 232 forming a hopper 234 for holding a stack 224 of mediums 220. The housing 230 including the stack 224 of mediums 220 is mounted to the dispenser 210. The dispenser 210 is located over the conveyor belt assembly 250 such that a medium 220 can be individually dispensed onto the conveyor belt assembly 250.

In one embodiment of this system 200, the dispensing of the medium 220 onto the conveyor belt assembly 250 is controlled by a first sensor 240 located beneath the dispenser 210. The first sensor 240 interfaces with a microprocessor 218 by sending a plurality of signals to the microprocessor 218 to communicate the presence or absence of a medium 220 in the dispenser 210.

In operation, the microprocessor 218 receives a plurality of signals from the first sensor 240 indicating the presence or absence of a medium 220 in the dispenser 210. If a medium 220 is present in the dispenser 210, a signal is sent to the microprocessor 218 indicating the presence of a medium 220 in the dispenser 210. A second signal is then sent to the dispenser 210 to dispense the medium 220 onto the conveyor belt surface 254. If the first sensor 240 does not detect the presence of a medium 220 in the dispenser 220, a signal is sent to the microprocessor 218 indicating that the hopper 234 needs to be refilled. It can be appreciated that the first sensor 240 can be located anywhere on the system 200 as long as the first sensor 240 can control the dispensing of the medium 220 onto the conveyor belt assembly 250.

The first sensor 240 is preferably a proximity sensor having a light-emitting diode (LED) and a receptor. However, the first sensor 240 can be any type of sensor including micro-switches, capacitive sensors, inductive sensors, or magnetic read switches, which recognize the presence of the medium 220 on the conveyor surface 250.

In one embodiment of this system 200, the dispenser 210 is preferably a dispenser 210 as described in Wolfer et al., U.S. Pat. No. 6,135,316, which is incorporated herein by reference in its entirety. The dispenser 210, as disclosed in U.S. Pat. No. 6,135,316, dispenses a medium 220 from the bottom of a stack 224 of mediums 220. The dispenser 210 has an upper guide, a lower guide and a plate slidably mounted between the upper guide and the lower guide. The upper guide and lower guide define an opening, wherein the plate slides to dispense the medium 220 through the lower guide opening onto the conveyor belt assembly 250. It can be appreciated, however, that the dispenser 210 can use pick and place technology or any other known method for dispensing a disk or medium 220 onto a conveyor belt assembly 250.

The conveyor belt assembly 250 conveys the medium 220 from the first position 212 to the second position 214. The movement of the conveyor belt assembly 250 enables the dispenser 210 to continuously dispense mediums 220 onto the conveyor belt assembly 250 without having to interrupt the marking process.

The conveyor belt assembly 250 includes a support frame 262, a pair of first rollers 264, a pair of second rollers 266, a third roller 270, a fourth roller 272, a fifth roller 274 and a pad 290. The support frame 262 is located between the pair of first rollers 264 and the pair of second rollers 266. The belts 252 preferably will lay flat or planar on top of the support frame 262 of the conveyor belt assembly 250. The support frame 262 ensures a stable and uniform marking process. The endless belts 252 loop around the pair of first rollers 264 and the pair of second rollers 266 forming the conveyor surface 254. The pair of first rollers 264 and the pair of second rollers 266 are preferably fly wheels having a uniform diameter for each of the rollers.

As shown in FIG. 9, the third roller 270, fourth roller 272 and fifth roller 274 are located beneath the marking device 280 and guide the conveyor belts 244 around the pad 290. The pad 290 catches over spray and excess ink from the marking device 280 during the marking of the medium 220. Accordingly, the pad 290 can be constructed of a felt like material or any other type of absorbable material for catching the over spray. The pad 290 is replaceable and can be designed based on the type of marking device 280. It can be appreciated, however, that the system 200 can be designed with or without the pad 290 depending on the type of marking device 280 that is used.

The first roller 270 attaches a motor assembly 278, including a gear drive and motor. A set of gears 276 imparts a rotation motion to the first roller 270. In the preferred embodiment of this system 200, the motor assembly 278 includes a DC motor. However, it can be appreciated that the motor assembly 278 can also include a magnetic stepper motor, servo motor, a stepper motor, a step-servo motor, or any other means which controls the conveyor belt assembly 250 in short and essentially uniform angular movements.

The first roller 270 controls the movement and rotation of the conveyor belt assembly 250 by imparting a uniform rotational velocity to the conveyor belt assembly 250. Furthermore, by controlling the movement of the conveyor belt assembly 250, the first roller 270 controls the speed of the marking process, which will ensure a consistent, and uniform marking process. It can be appreciated that the speed of the conveyor belt assembly can vary depending on the type of marking device.

The second roller 272 and third roller 274 guide the conveyor belt assembly around the pad 290. The first roller 272 preferably has a diameter greater than the diameter of the second roller 272 and the third roller 274, since the first roller 270 controls the movement of the conveyor belt surface 254. Generally, the second roller 272, the third roller 274, the first pair of rollers 264 and the second pair of rollers 266 will have a smaller diameter since they guide the conveyor belt surface 254. For example, the first roller 270 can have a diameter of approximately ⅞ of an inch. Meanwhile, the second roller 272, the third roller 274, the first pair of rollers 264 and the second pair of rollers 266 can have a diameter of approximately ⅝ of an inch. However, it can be appreciated that the diameter of the first roller 270, the second roller 272, the third roller 274, the first pair of rollers 264 and the second pair of rollers 266 can vary depending on the size of the device and the medium in which the device is designed.

The marking device 280 will preferably be a silk screen printer, a printer utilizing ink jet printing technology, a labeling process or a thermal printing process. However, it can be appreciated that the marking device can be a duplicating, a replicating device, or a reading and recording device. In addition, the system 200 can be a stand-alone printer.

The second sensor 310 directs the marking of the medium 220. In one embodiment, the second sensor 310 is a flag sensor located on a pivot just above the conveyor belt surface 254 between the dispenser 210 and the marking device 280. As the medium 220 advances toward the marking device 280, the medium 220 will trip the second sensor 310, which starts the marking process. The second sensor 310 communicates with the microprocessor 218 by sending a plurality of signals to indicate the presence of a medium 220 on the conveyor belt surface 254, and the position of the medium 220 on the conveyor belt surface 254 including the relative positions of the medium to the marking device 280. The second sensor 310 also communicates with the microprocessor 218 to supply power to the marking device 280. The second sensor 310 can alternatively be an optical proximity sensor, a micro-switch, a capacitive sensor, an induction sensor, a magnetic read switch or any other sensor known to one skilled in the art which recognizes the presence of the medium 220 on the conveyor belt surface 254 and is able to control the marking process.

In addition, the marking device 280 includes a first micro-switch 242 to assist with the dispensing of the medium 220 onto the conveyor belt surface 254. The first micro-switch 242 is located on the marking device 280 and interfaces with the microprocessor 218 by sending a plurality of signals to the microprocessor 218. The first micro-switch 242 communicates the status of the marking process including communicating with the dispenser 210 via the microprocessor 218 to dispense a medium 220 onto the conveyor belt surface 254.

Once the marking process has been completed, the conveyor belt assembly will advance the medium 220 to the second position 214 wherein the medium 220 is placed in a receptacle 330 for holding a stack of mediums 220.

In one embodiment, the receptacle 330 is an upstacker as disclosed in Wolfer et al. U.S. Pat. No. 6,337,842 and U.S. patent application Ser. No. 09/828,569, filed on Apr. 5, 2001, which are incorporated herein. As shown in FIGS. 9-13, the receptacle 330 includes a plurality of posts 332 forming a housing 334 for stacking a plurality of mediums 220. An elevator pin 336 is located beneath the conveyor belt surface to lift the mediums from the conveyor belt assembly 250 into the housing 334. The housing has a plurality of pawls 338 attached to the posts 332 to stack the mediums into the housing 334.

The operation of the receptacle 330 is controlled by a third sensor 244 located beneath the receptacle 330. The third sensor 244 is also able to detect the presence or absence of a medium 200 on the conveyor belt assembly 250 at the receptacle 330 and communicates with the microprocessor 218. If a medium 220 is present, the microprocessor 218 sends to a signal to a linkage assembly 350 attached to the elevator pin 336. The linkage assembly has a motor 352 and a set of gears 354 for lifting the elevator pin 336 from a first position 356 to a second position 358.

The third sensor 244 preferably is a proximity sensor having a light-emitting diode (LED) and a receptor. However, the third sensor 244 can also be an optical sensor, a micro-switch, a capacitive sensor, an induction sensor, a magnetic read switch or any other sensor known to one skilled in the art which recognizes the presence of the medium 220 on the conveyor belt surface 254.

In operation, as shown in FIGS. 13A-D, the elevator pin 336 presses the medium 220 upwards and the medium engages the stack 340 of mediums 220 from the bottom and presses into the stack 340. The medium 220 passes a hooked end 342 of the pawl 338 and once the medium 220 lifts above the hooked end 342 of the pawls 338, the pawls 338 drops downward into an extended configuration under the influence of gravity. The stack 340 of mediums 220 rest on the hooked ends 342 of the pawls 338. Although only a few mediums 220 are shown in the stack 340, the present invention is intended to lift a magnitude of mediums 220. The mediums 220 may include optical media, such as compact disks, CD-Rs, CD-RWs, digital video disks or digital versatile disks, computer chips, paper products, and paper like products.

Figure 14:
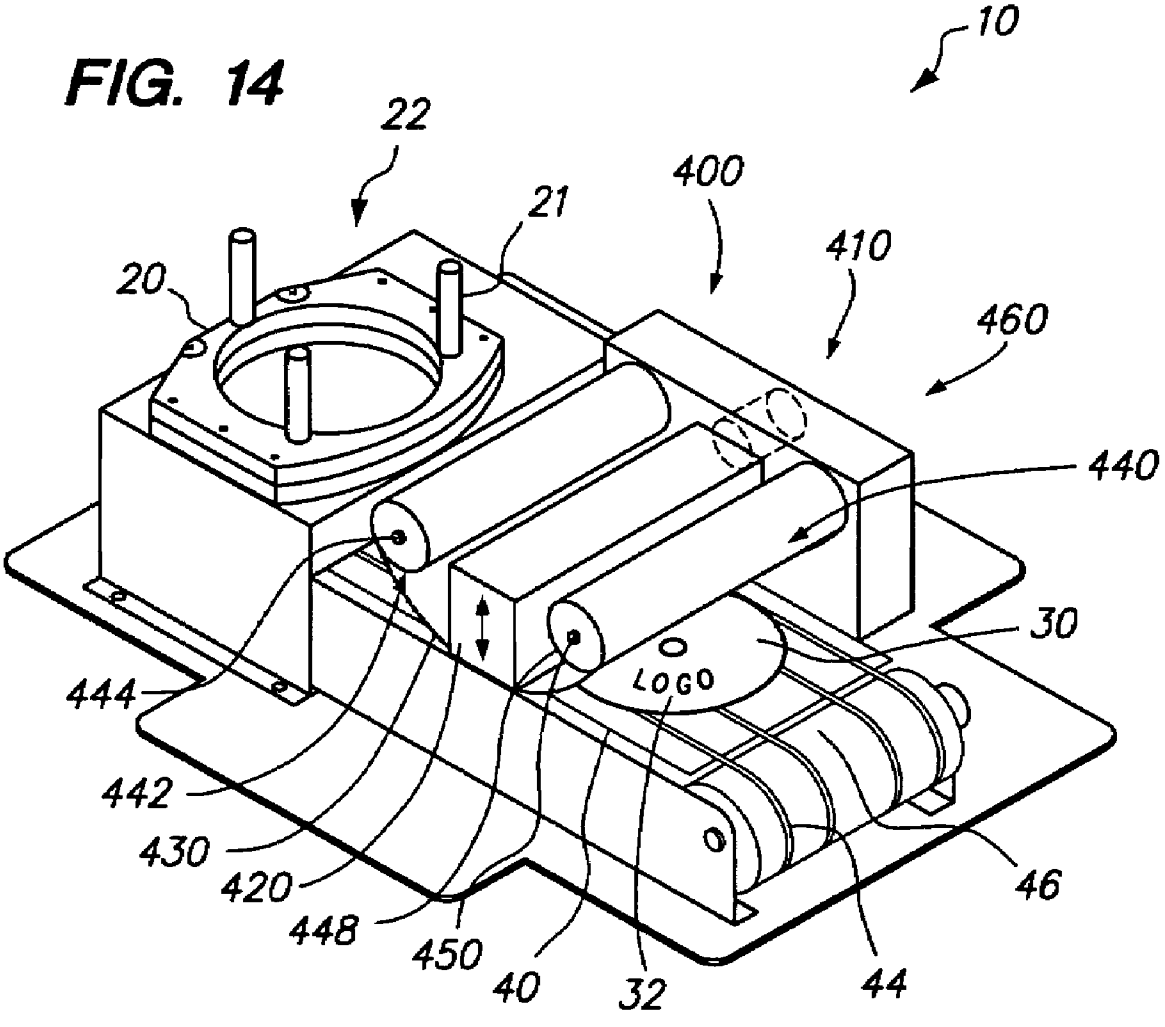
FIG. 14 is a perspective view of another embodiment of the in-line marking system having a thermal transfer printer.

An alternative embodiment of the in-line marking system 10 (as shown in FIGS. 1-11) is shown in FIG. 14. FIG. 14 shows an in-line marking system 100 comprising a dispenser 20 configured to dispense a medium 30, a conveyor belt assembly 40, and a thermal print engine 400 to mark indicia 32 on the medium 30. It can be appreciated that the thermal print engine 400 can be a thermal transfer printer or a direct transfer printer without departing from the present invention.

As shown in FIG. 14, the thermal print engine 400 is a thermal transfer printer 410 comprising a stationary print head 420 and a thermal transfer ribbon 430. A voltage is applied to the thermal transfer print head 420 that consists of heat resistors 422 (FIG. 15) in the form of resistive heating elements. Typically, the print head 420 has a thin coating of a resistive material, which covers the print head 420. The thin coating protects the heating elements or resistors 422 from abrasion as the thermal transfer ribbon 430 makes contact with the print head 420.

The line of print head resistors 422 are in direct pressure contact with the back side of the thermal transfer ribbon 430. The ink side of the ribbon 430 is in direct contact with the medium 30. It can be appreciated that the medium 30 can be a disk, a business card or any other suitable medium 30 configured to receive indicia. The medium 30 is driven by the conveyor assembly 40 under the print head 420 at a speed consistent with the heating cycle time of the print head 420.

A thermal printer ribbon assembly 440 comprises a supply roller 442 having a thermal print ribbon 430 carried on a spindle 444. Typically, the thermal print ribbon 430 has one end seated in a slot and the other end in a bearing (not visible) at the other side of the thermal transfer printer 410. The print ribbon 430 is fed underneath the print head 420 to a receiving roller 448. The receiving roller 448 is mounted on a spindle 450 on which is mounted a gear system 462 that is driven by a motor 464. The gear system 462 and the motor 464 form part of the print head assembly 460.

In operation, heat from the printing elements or heat resistors 422 raise the ink to a temperature above its melting point. At this time the ink from the ribbon 430 transfers to the medium 30 and adheres to it. Together, the ribbon 430 and the medium 30 continue to move from under the print head 420 for a short distance before separation of ribbon 430 and medium 30 occurs. It is at this point that the image is formed on the medium 30.

The dispenser 20 comprises a hopper 22 having at least three posts 21 for holding a plurality or a stack of mediums 30, and more preferably a plurality of disks. The dispenser 20 is preferably a dispenser as described in Wolfer et al., U.S. Pat. No. 6,135,316, which is incorporated herein by reference in its entirety. The dispenser 20, as disclosed in U.S. Pat. No. 6,135,316, dispenses a disk 30 from the bottom of a stack of mediums 30.

The dispenser 20 comprises an upper guide, a lower guide and a plate slidably mounted between the upper guide and the lower guide. The upper guide and lower guide define an opening, wherein the plate slides to dispense the medium 30 through the lower guide opening. However, it can be appreciated that the dispenser 420 can use pick and place technology or other suitable device or apparatus for dispensing a medium 30 from the bottom of the stack of mediums 30. Preferably, the mediums 30 are compact disks, and more preferably the dispenser 20 can accommodate 25 to 150 compact disks and more preferably 25-50 compact disks at a time. The medium 30 can be CD-Rs, CD-RWs, DVDs and any other desirable type of recordable medium or disk.

In operation, the dispenser 20 dispenses the lower-most medium 38 from the stack of mediums 30 onto the conveyor belt surface 46 of the conveyor belt assembly 40. The system 100 can include a conveyor belt guide member 60, which is configured to guide the medium 30 onto the conveyor belt surface 46 of the conveyor belt assembly 40. The conveyor belt guide member 60 is preferably positioned below the dispenser 20 of the system 52 and above the conveyor belt surface 46. The conveyor belt guide member 60 can be a plate like member having an opening 62, which guides the medium 30 onto the conveyor belt surface 46. The opening 62 of the conveyor belt guide member 60 is preferably slightly larger than an outer diameter of the medium 30. For example, using a standard CD/DVD disk having an outer diameter of approximately 4.72 inches, the opening 62 will be circular having an outer diameter of about 4.73 to about 4.95 inches and more preferably about 4.75 to about 4.80 inches. It can be appreciated that the diameter of the opening 62 will varying according to the outer diameter of the medium 30 being dispensed from the dispenser 20. Once the medium 30 has been delivered to the conveyor belt surface 46, the thermal print engine 400 marks indicia 32 on the medium 30.

In operation, the medium 30 is dispensed from the dispenser 20 onto the conveyor belt assembly 40. The conveyor belt assembly 40 conveys the medium 30 to the thermal print engine 400, wherein the thermal transfer printer 410 or a direct transfer print engine 500 (FIG. 16) marks indicia 32 onto the surface of the medium 30. As the medium 30 is conveyed from the first position to the second position, the take-up roller 448 preferably draws the print ribbon 430 from the print ribbon supply roller 442 at a constant speed to prevent smearing as the print head 420 presses against the medium 30.

The movement of the print ribbon 430 is preferably controlled by a thermal ribbon assembly 440. The ribbon assembly 440 comprises a plurality of gears 442 and at least one motor 444. The ribbon assembly 440 is configured to control the movement of the print ribbon 430 from the supply roller 442 to the take-up roller 448.

The microprocessor 120 directs the dispensing and the marking process of the thermal print system 100. The microprocessor 120 controls the dispenser 20, the thermal print engine 400, and the motor assembly 90 and thereby the conveyor belt assembly 40 by receiving a plurality of signals from sensors 140, 150, 152 located throughout the system 10. It can be appreciated that the number of sensors needed varies based on the embodiment, including the type of the disk dispenser 20, and the thermal print engine 400. For example, if the system 100 includes a thermal print engine 400 and a duplicating and replicating device for producing multiple copies of the medium 30, the system 100 may require additional sensors.

In operation, a first sensor 140 senses the presence of the medium 30 on the conveyor belt assembly 40 and communicates the presence of the medium 30 to the microprocessor 120. The microprocessor 120 then directs the motor assembly 90 to advance the second roller 56. The second roller 56 rotates causing the conveyor surface 46 to rotate and advances the medium 30 toward the thermal print engine 400. The first sensor 140 is preferably an optical proximity sensor having a light-emitting diode (LED) and a receptor. However, it can be appreciated that the first sensor 140 can be any type of sensor including micro-switches, capacitive sensors, inductive sensors, or magnetic read switches, which recognize the presence of the medium 30 on the conveyor surface 46.

The first sensor 140 is also able to detect the presence or absence of a medium 30 in the dispenser 20. The microprocessor 120 receives a signal from the first sensor 140 and uses this information to determine whether the mediums 30 in the dispenser 20 need to be refilled. If a medium 30 is present in the dispenser 20, a signal is sent from the microprocessor 120 to the dispenser 20 to dispense the medium 30 onto the conveyor surface 46 for marking by the marking device 80.

A second sensor 150 is located on or near the conveyor surface 46 and detects the presence of the medium 30 on the conveyor surface as the medium 30 advances toward the thermal print engine 400. In one embodiment, the second sensor 150 is a flag sensor, which has a pivoting lever, which detects the medium 30 as the medium 30 advances. However, as with any of the sensors of the system 10, the second sensor 150 can be an optical proximity sensor, a micro-switch, a capacitive sensor, an inductive sensor, a magnetic read switch or any other sensor known to one skilled in the art which recognizes the presence of the medium 30 on the conveyor surface 46.

The second sensor 150 sends a signal to the microprocessor 120 to begin the marking process. Once the marking process has been completed, if appropriate, the microprocessor 120 sends another signal to the dispenser 20 to release another medium 30 onto the conveyor surface 46 or alternatively the microprocessor 120 directs the system 10 to cease operation. In addition, the microprocessor 120 controls the movement of the conveyor belts 44 such that the medium 30 is dispensed onto the conveyor surface 46 at the correct intervals.

A thermal print sensor 152 is located at or near the lower surface of the thermal transfer printer 410 and senses an upper surface of the medium 30. The print sensor 152 in conjunction with the second sensor 150 controls the printing process by detecting the upper surface of the medium 30. This information is provided to the microprocessor 120, which conveys the information to the print head assembly 460 including the gear system 462 and the motor 464. The gear system 462 of the print head assembly 460 adjusts the print head 420 to accommodate different mediums 30. In addition, the thermal print sensor 152 is configured to guide the print ribbon 430 onto the upper surface of the medium 30 and applying a contact pressure to the medium 30. The thermal print sensor 152 also provides the system 10 the ability to thermal print onto a variety of mediums 30 with different thicknesses.

In an alternative embodiment, the system 10 can be designed without the print head sensor 152 and instead a medium sensing mechanism (not shown) can be implemented. The medium sensing mechanism can be a sensor as described, or a mechanical device configured to detect the upper surface of the medium 30 to be marked. If a mechanical device is implemented, the device senses or detects the upper surface of the medium and provides a signal to the microprocessor 120 to adjust the print head 420 accordingly. The thermal print head 420 should contact the printable surface of the medium 30 at a uniform pressure for optimum transfer of a marking medium from the thermal ribbon 430.

It can be appreciated that the power required by the thermal print head 420 can be proportional to a number of heat resistors 422 energized on the length of the print line. A stepper motor drives the conveyor belt assembly 40 and its support past the print head 420 at a speed, which varies as the printed substrate (typically a CD, DVD or CD-R) moves past the print head 420. It can be appreciated that by varying the speed of the medium 30, the print speed can be maximized within the constraints of the limited power supply within a stand alone unit.

The most efficient methodology to provide high print speed and low demand on the power is to move the medium 30 on the conveyor belt assembly 40 as quickly as is possible without impacting print quality. When a medium 30 such as a compact disk is used, the print sensor 152 is configured to adjust to the circular shape of the disk, when the disk is moved into contact with the print head 420. Initially, with a disk, the print line is short, however, the print line length increases until a position near the diameter of the medium 30 is reached (the disk has a center hole) then the length of the print line decreases until it reaches a local minimum at the center. The second half of the disk is symmetrical with respect to the center.

Based on the location of the medium 30 relative to the print head 420, the microprocessor 120 sends a signal to the motor 80 to advance the conveyor belt assembly 40. As the conveyor belt assembly 40 advances, the microprocessor 120 receives a series of signals from the sensors 140, 150, 152. The microprocessor 120 sends a signal to the dispenser 20 to release another medium 30 onto the conveyor belt assembly 40. The microprocessor 120 controls the movement of the conveyor belt 44 such that the medium 30 is dispensed onto pocket 42 of the conveyor belt assembly 40 at the correct intervals. After the marking of indicia 32 onto the medium 30 by the thermal print engine 400 is completed, the microprocessor 120 sends a signal to the motor 80 to either continue with the marking process or cease operation.

Figure 15:
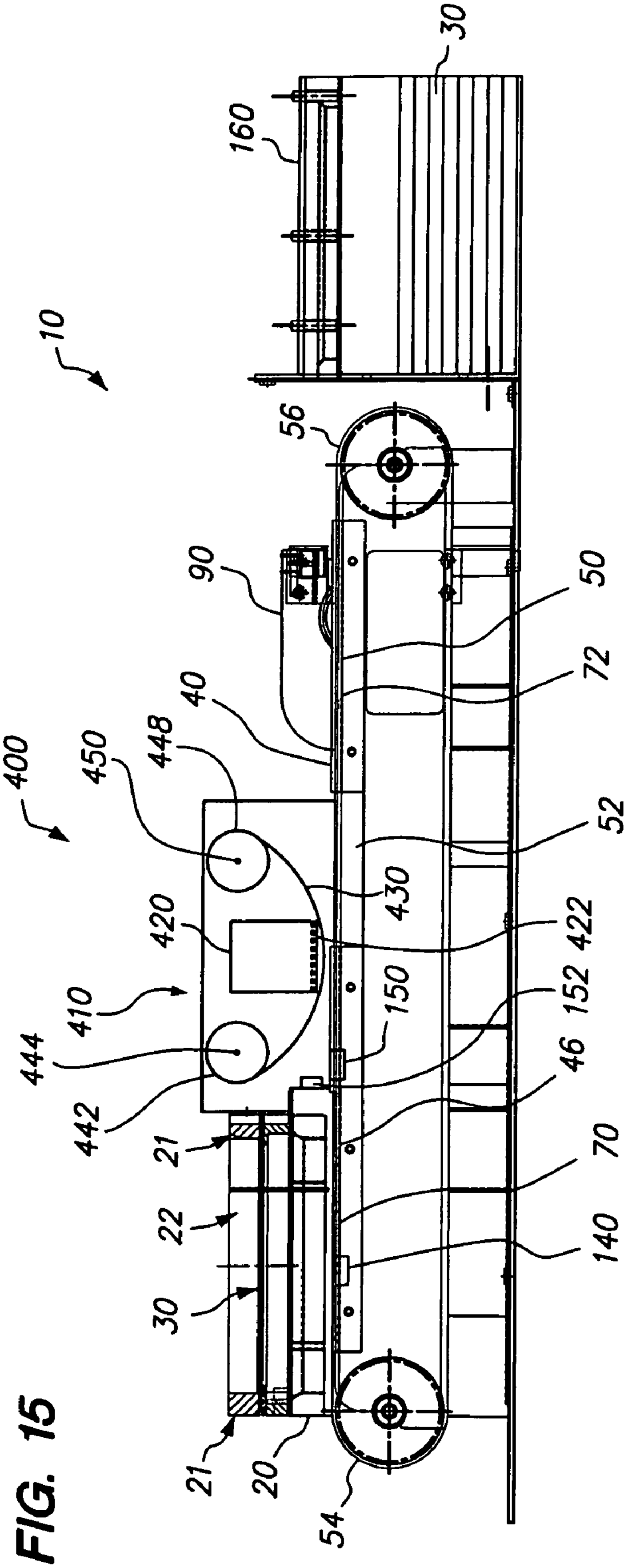
FIG. 15 is a side elevation view of the in-line marking system of FIG. 14.
Figure 16:
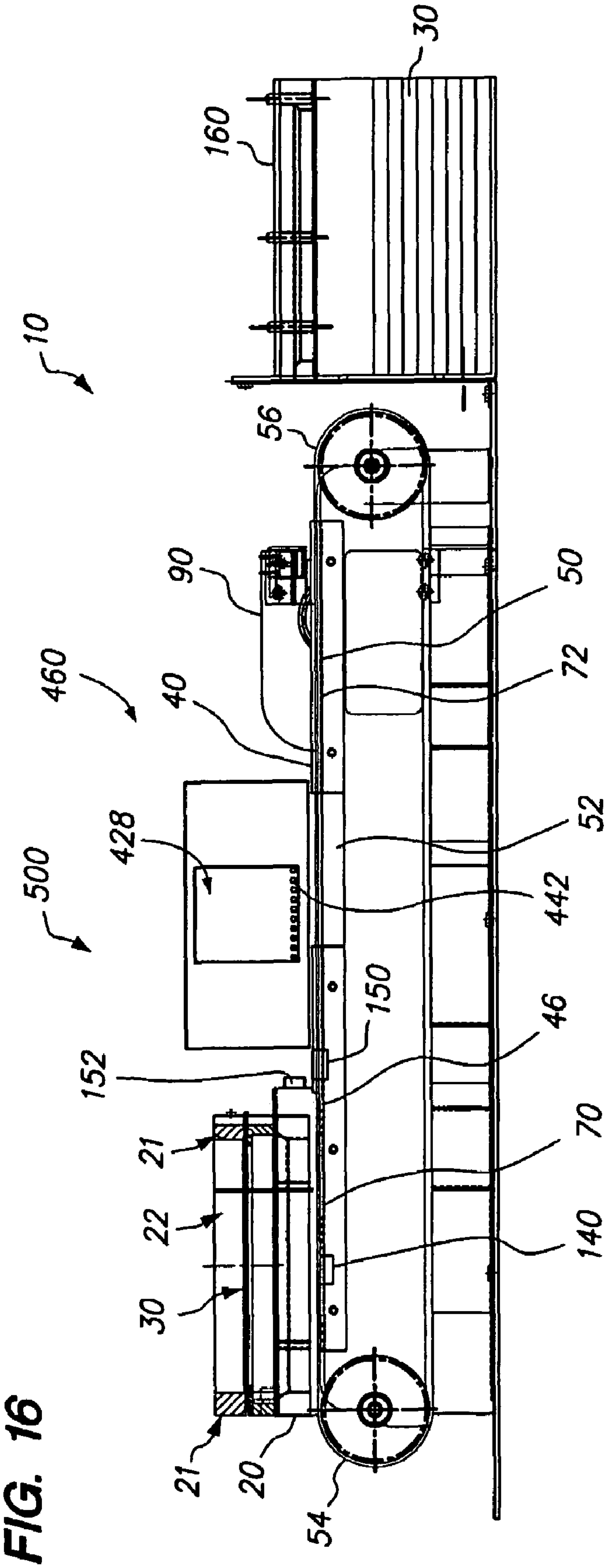
FIG. 16 is a side elevation view of an alternative embodiment of the in-line marking system having a direct transfer printer.

FIG. 16 shows a side view of a direct transfer print engine 500. The direct transfer printer 500 uses thermally sensitive mediums 30 that change color when heated. Thus, the thermal ribbon 430 (as shown in FIG. 15) is not needed. Instead, the thermally sensitive direct transfer printer 500 marks the medium 30 by generating a pattern of heated and non-heated areas on the surface of the medium 30, as the medium 30 moves under a direct transfer print head 428.

As shown in FIG. 16, the direct transfer printer 500 comprises a direct transfer print head 428 having a plurality of heating elements 422, a thermal print sensor 152 and a print head assembly 460. The print sensor 152 in conjunction with the second sensor 150 controls the printing process by detecting the upper surface of the medium 30. This information is provided to the microprocessor 120 and is conveyed to the print head assembly 460. The print head assembly 460 comprises a gear system 462 and a motor 464. The print head assembly 460 adjusts the direct transfer print head 428 and guides the print head 428 onto the upper surface of the medium 30. The thermal print sensor 152 provides the system 100 the ability to thermal print onto a variety of mediums 30 with different thicknesses.

While the invention has been described in detail with reference to the preferred embodiments thereof, it will be apparent to one skilled in the art that various changes and modifications can be made and equivalents employed, without departing from the present invention.

The invention claimed is:

1. A thermal printer comprising:

a dispenser configured to dispense a bottom medium from a stack of mediums;

a conveyor belt assembly configured to receive the medium from the dispenser and convey the medium from a first position to a second position, the conveyor belt assembly comprised of a plurality of belts forming a planar conveyor surface, and wherein the dispenser is disposed over the first position so that the bottom medium from the stack of mediums falls to the first position when dropped by the dispenser;

a support frame, wherein the plurality of conveyor belts lies flat on top of the support frame;

a thermal printer located between the first position and the second position and configured to mark indicia on the medium; and at least one sensor configured to position a print head of the thermal printer on an upper surface of the medium during the marking process.

2. The printer of claim 1, wherein the thermal printer is a thermal transfer printer.

3. The printer of claim 1, wherein the thermal printer is a direct transfer printer.

4. The printer of claim 1, wherein the medium is a disk.

5. The printer of claim 1, further comprising a conveyor belt guide member including an opening configured to receive and guide the bottom medium onto the first position of the conveyor belt assembly.

6. The printer of claim 1, wherein the stack of mediums is a vertical stack of mediums.

7. A thermal transfer printer comprising:

a dispenser configured to dispense a bottom disk from a stack of disks;

a conveyor belt assembly configured to receive the disk from the duplication system and convey the disk from a first position to a second position, the conveyor belt assembly comprised of a plurality of belts forming a planar conveyor surface, and wherein the dispenser is disposed over the first position so that the bottom disk from the stack of disks falls to the first position when dropped by the dispenser;

a support frame, wherein the plurality of conveyor belts lies flat on top of the support frame;

a thermal transfer printer located between the first position and the second position and configured to mark indicia on the disk, the thermal transfer printer comprising a thermal print head and a thermal ribbon; and at least one sensor configured to position the thermal ribbon on an upper surface of the disk.

8. The system of claim 7, further comprising a conveyor belt guide member including an opening configured to receive and guide the bottom disk onto the first position of the conveyor belt assembly.

9. The system of claim 7, wherein the stack of disks is a vertical stack of disks.

* * * * *